US012384193B2

(12) United States Patent
Sheth et al.

(10) Patent No.: US 12,384,193 B2
(45) Date of Patent: Aug. 12, 2025

(54) EMBOSSING ART TOOLS

(71) Applicants: Vikram Jivanlal Sheth, Lithia, FL (US); Jatan Vikram Sheth, Lithia, FL (US)

(72) Inventors: Vikram Jivanlal Sheth, Lithia, FL (US); Jatan Vikram Sheth, Lithia, FL (US)

( * ) Notice: Subject to any disclaimer, the term of this patent is extended or adjusted under 35 U.S.C. 154(b) by 667 days.

(21) Appl. No.: 16/826,279

(22) Filed: Mar. 22, 2020

(65) Prior Publication Data

US 2020/0384796 A1 Dec. 10, 2020

(51) Int. Cl.
*B44B 11/04* (2006.01)

(52) U.S. Cl.
CPC .................................... *B44B 11/04* (2013.01)

(58) Field of Classification Search
CPC .................................. B44B 11/04; B31F 1/07
See application file for complete search history.

(56) References Cited

U.S. PATENT DOCUMENTS

| | | | | | |
|---|---|---|---|---|---|
| 690,853 | A * | 1/1902 | Grabler | B31F 1/07 | 101/23 |
| 6,446,549 | B1 * | 9/2002 | Soucie | B31F 1/07 | 101/4 |
| 2003/0118689 | A1 * | 6/2003 | Carlson | B43L 13/206 | 425/193 |
| 2004/0221751 | A1 * | 11/2004 | Arnold | B26F 1/22 | 101/3.1 |

* cited by examiner

*Primary Examiner* — Jill E Culler
(74) *Attorney, Agent, or Firm* — Michael D. Eisenberg

(57) ABSTRACT

A hand-held and mountable Tongs type embossing art tool having two extended arms joined, with their open ends bent towards each other to create teeth-type tips. Media is pressed between the tips manually to form embossing art. For mechanically pressing, first rivet the rotating pressure plate at the joined of the two arms, then fix the embossing tool on the transparent engraving channel block-cum-tongs embossing tool holder having rotating holder strip. Apply pressure by rotating the pressure plate and slide paper between the two tips to create embossing art. Use the engraving template block with stylus of various tip sizes and shapes as in channel shapes like French curve and straight line with variously colored borders printed at the edge of the channels. Where card paper is to be rested upon the desired channel, pressing and sliding the stylus in the groove of the channel, create your own embossed art.

5 Claims, 42 Drawing Sheets

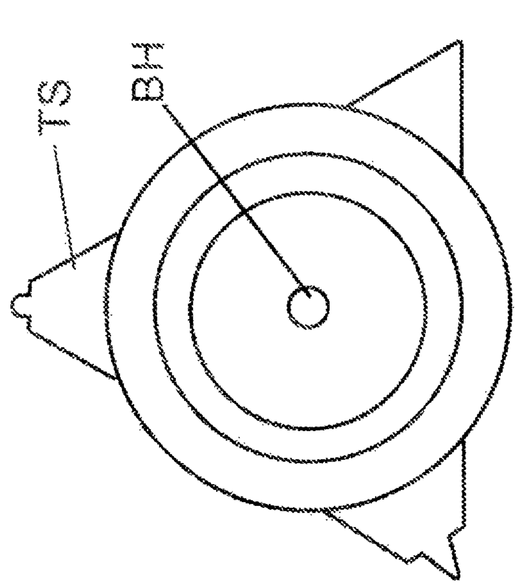
TS FIG.70
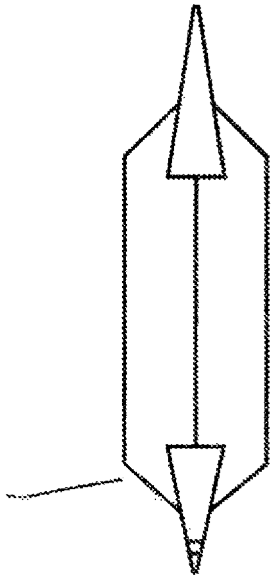
FIG. 72
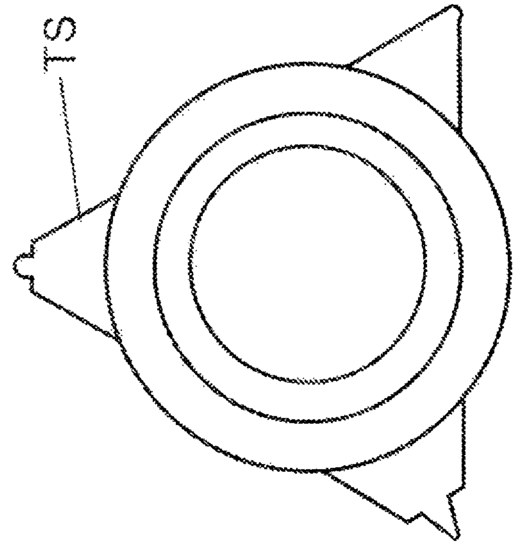
FIG.69
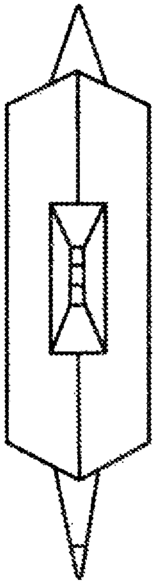
FIG. 71
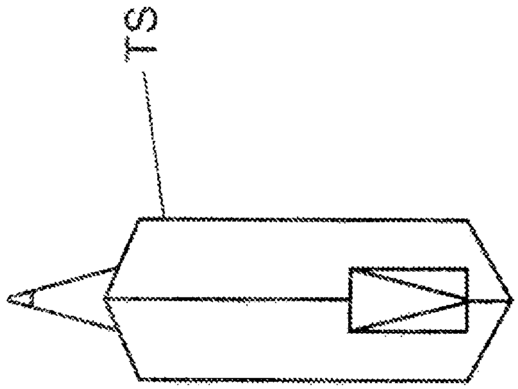
FIG. 68

EMBOSSING ART TOOLS

CROSS-REFERENCE TO RELATED APPLICATIONS

The present application claims U.S. Provisional patent application No. 62/827,022 Filed on 30 Mar. 2019 EFS ID 35581390 Confirmation Number 5292 Customer Number 145717

The entire disclosure is included here in its entirety by reference.

CLASSIFICATION

B44B 11/00

Artist's hand tools for sculpting, kneading, carving, engraving, guilloching or embossing; Accessories, therefore.

B44B 11/04

For embossing

B31F 1/07

Embossing of paper or cardboard without removing material included combined deformation and laminating.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

1. Field of Invention

The invention relates to hand-held and fixable tools for use in hobbies and crafts such as in scrap-books, greeting cards, creative artistic embossing work, photography, etc.

2. Related Art

Several hand-held tools exist for embossing paper or media that use the tools with a template, a light-box, and a stylus in a technique called "Dry Embossing". The user places the template on a light-box, and places the media on the template. This way, the user can see the pattern of the template's channels through the media, and he/she traces over the pattern by pressing the tip of the embossing tool on the media. The tip forces the paper or media into the template channel to deform the paper to create an embossed pattern, which is a raised pattern when viewed from the other side of the paper.

BRIEF DESCRIPTIONS OF SEVERAL VIEWS OF THE DRAWINGS

Figure 3:
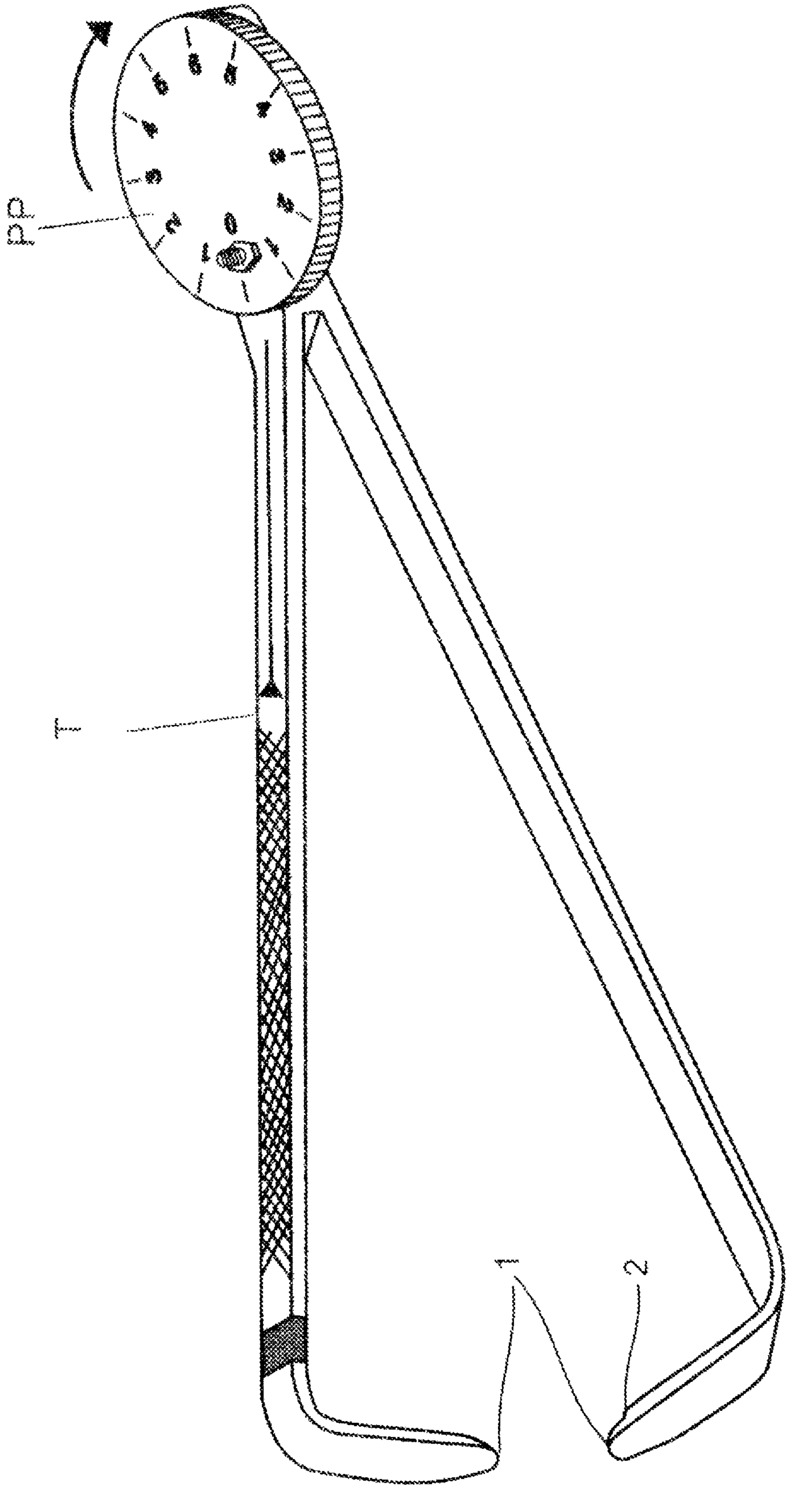
FIG. 3 is a perspective view of a embodiment of the invented Tongs-type embossing tool (T) and attachment of round pressure plate (PP) in the hole (5) at joint of the two arms. The arrows show the rotating movement of the pressure plate (PP).
Figure 10:
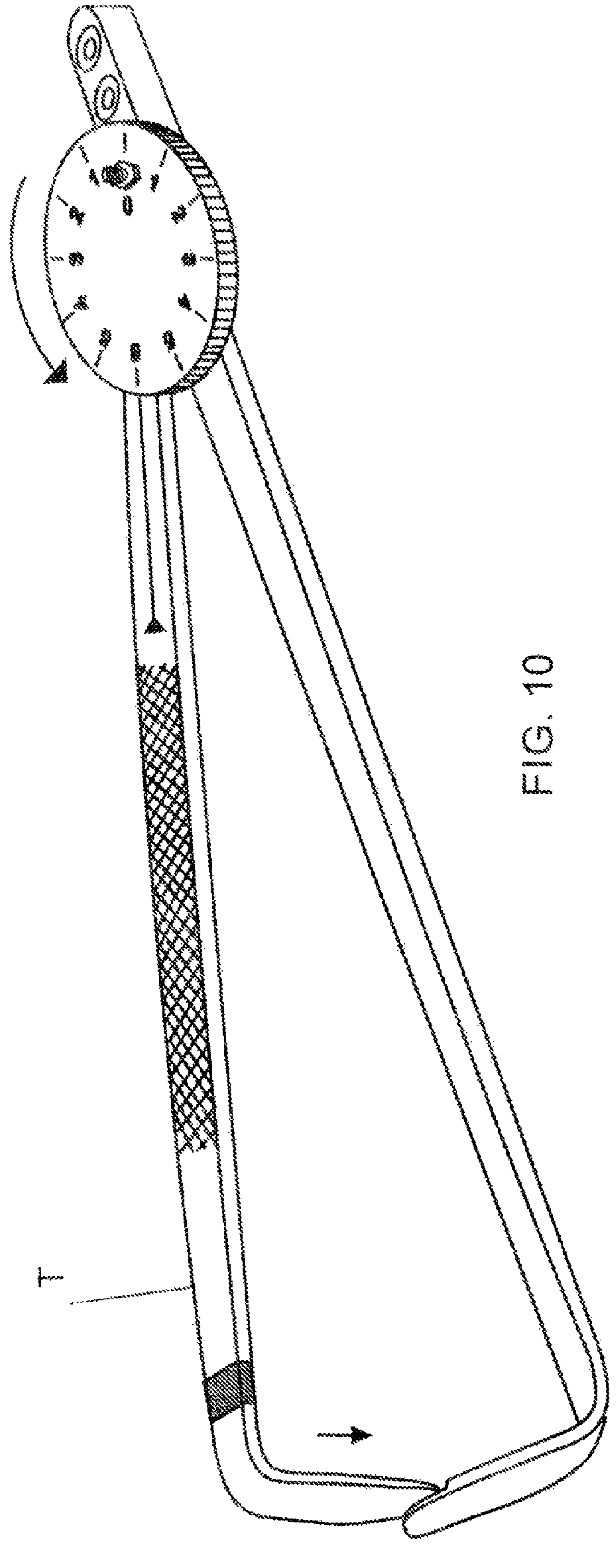

FIG. 10 is a perspective view of two embodiments of FIG. 3 showing the round pressure plate (PP) in pressure position at 6 on the dial (20) of pressure plate (PP) and both the tips (1) in touching/close position. Arrows show the movement of the upper arm's tips towards the lower arm's tip. Curved arrow shows the rotational movement of pressure plate (PP), and the lower arm is in a stationary position.

Figure 11B:
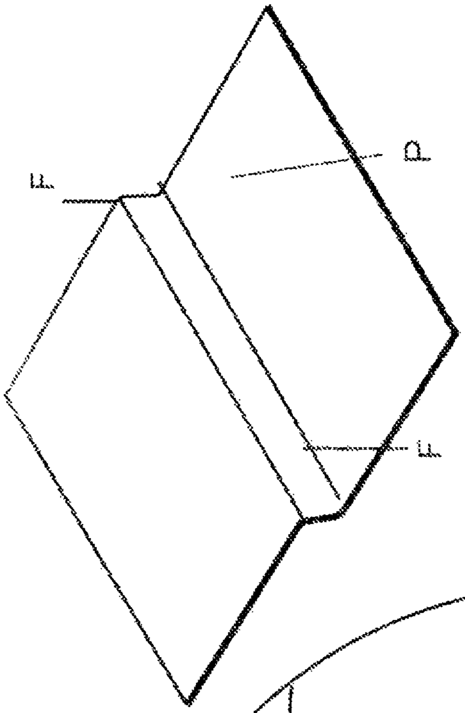
Figure 11C:
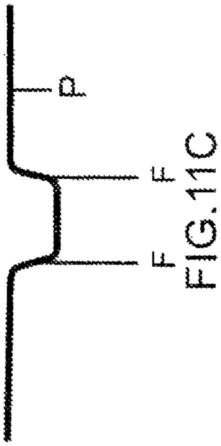
Figure 11:
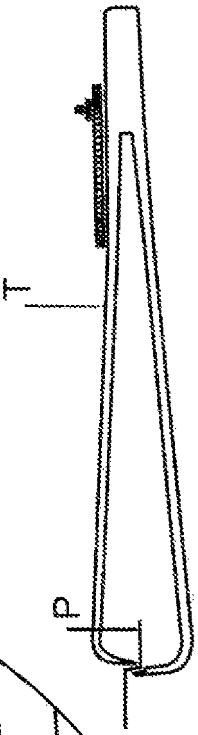

FIG. 11 is a right side view of embodiments of FIG. 10 wherein the card paper (P) is in between both the tips (1).

Figure 11A:
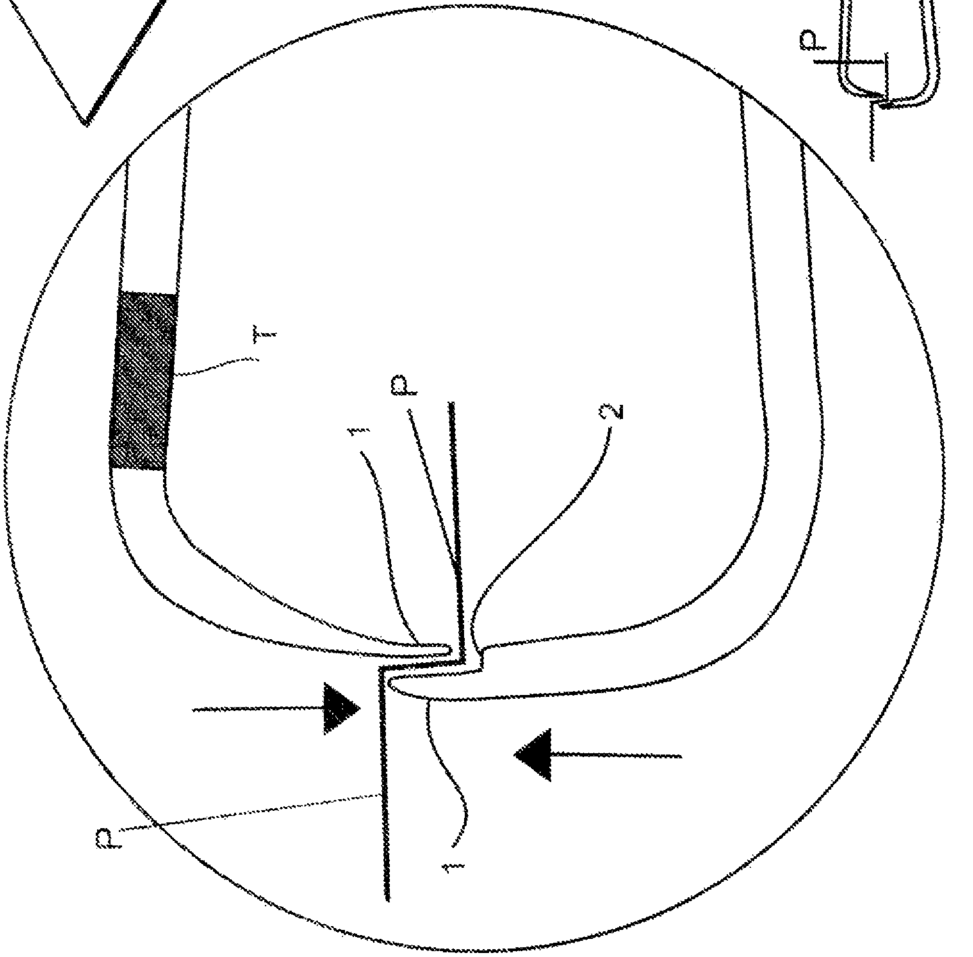

FIG. 11A is a detailed enlarged view of card paper in between the two tips (1) showing how the embossing art lines are created on card paper.

FIG. 11B is the perspective view of card paper, with the bend (F) of art line in letter "L" shape.

FIG. 11C is a side view of card paper showing the bent (F) letter "L" shape-art line in opposite/mirror image shape to each other.

Figure 12:
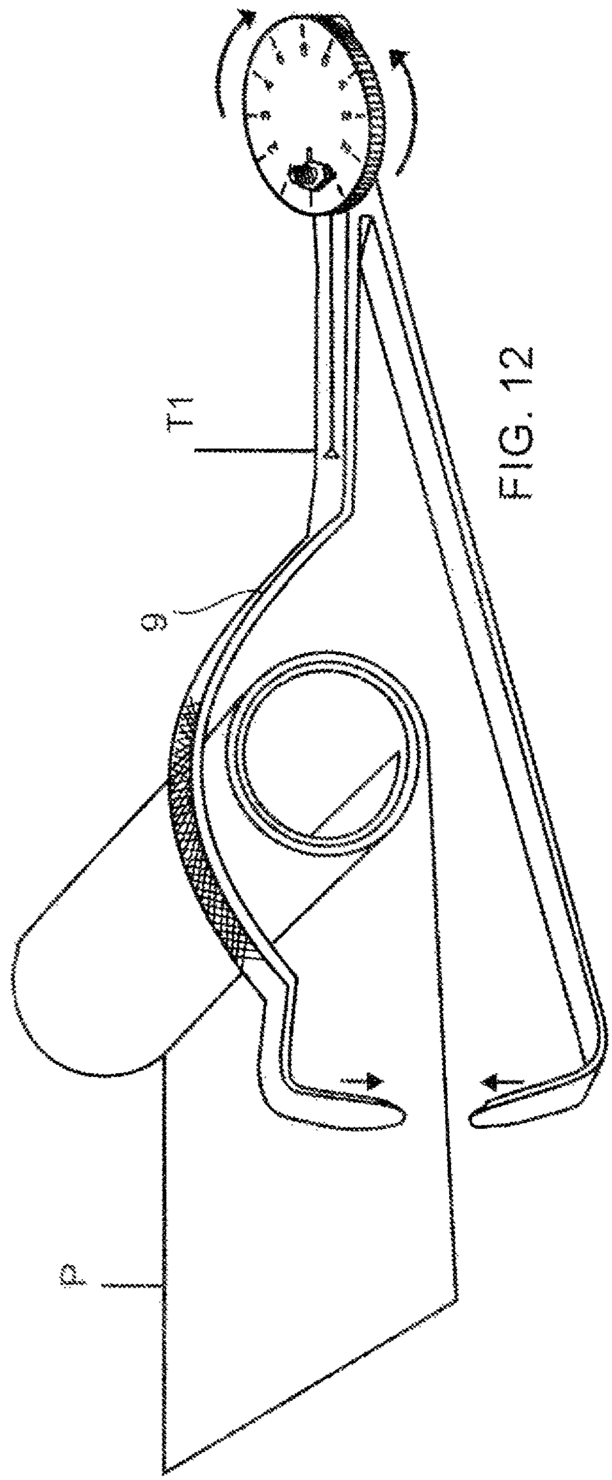

FIG. 12 is a version of Tongs-type embossing tool (T1), and the upper arm (9) is curved or bent upwards to create more space in between the two arms for accommodate bigger-sized card paper (P) or for book's paper to pass through. Paper (P) is rolled in between two arms.

Figure 13:
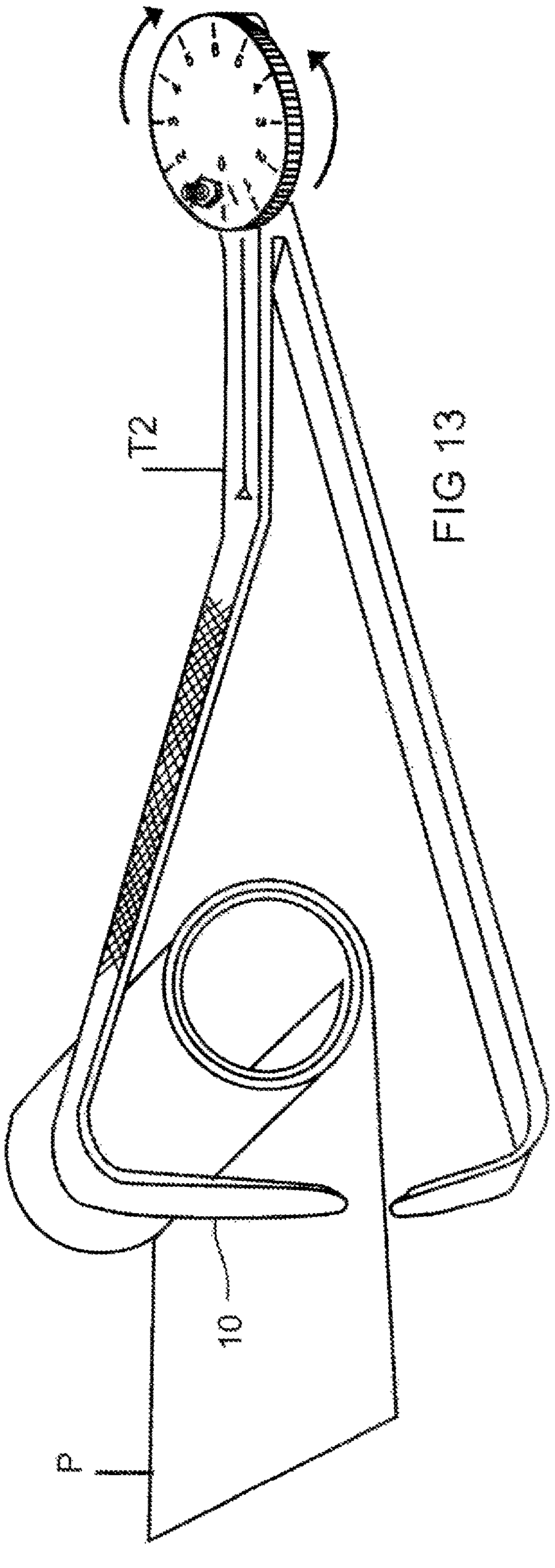

FIG. 13 is a version of Tongs-type embossing tool's (T2) upper Tooth (10) which is longer in order to create more space in between two arms for accommodate bigger-sized card paper (P) or for book's paper to pass through. Paper (P) is rolled in between two arms.

Figure 14:
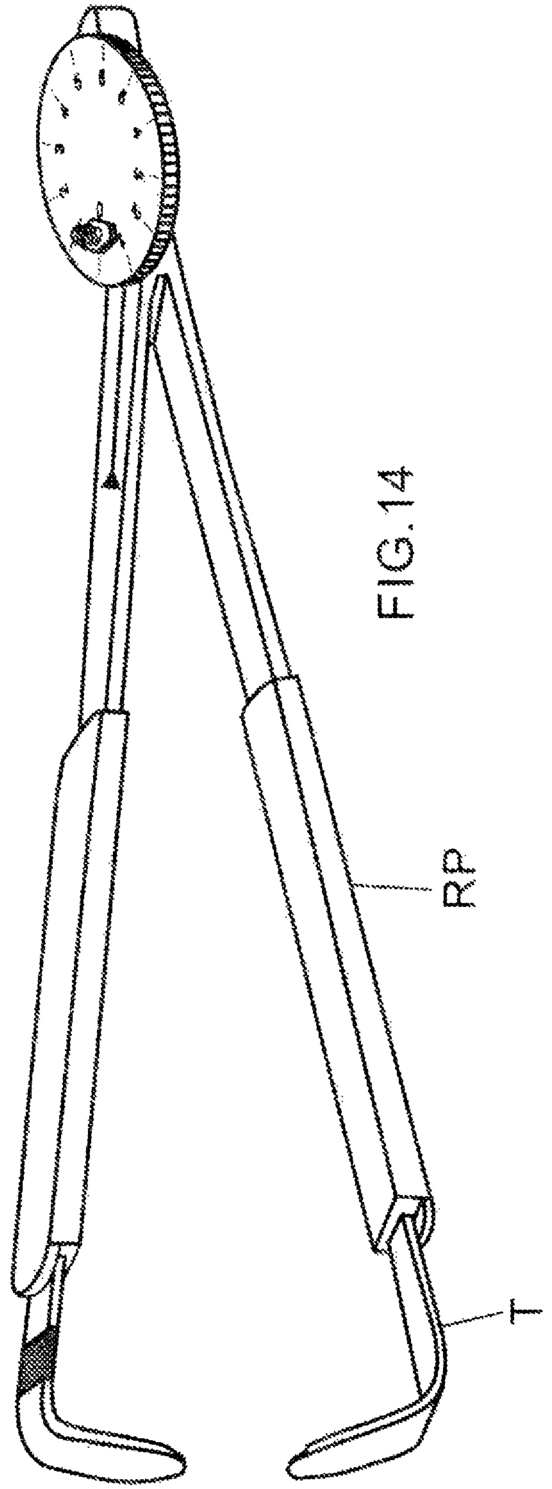

FIG. 14 is a perspective view of a version of Tongs-type embossing tool made of metal and the grips on upper and lower arms made of rubber/plastic (RP) nonskid material.

Figure 15:
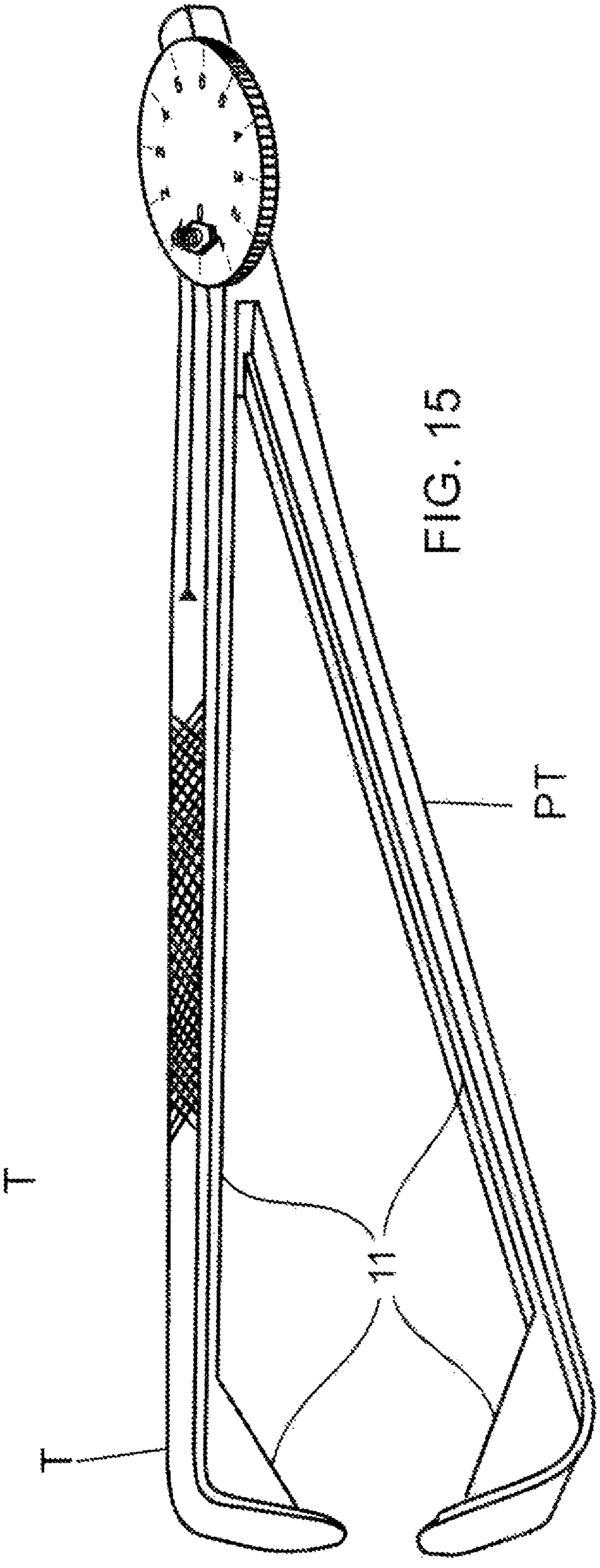

FIG. 15 is a perspective view of a version of plastic Tongs-type embossing as well. The Rib (11) is inside the arms.

Figure 16:
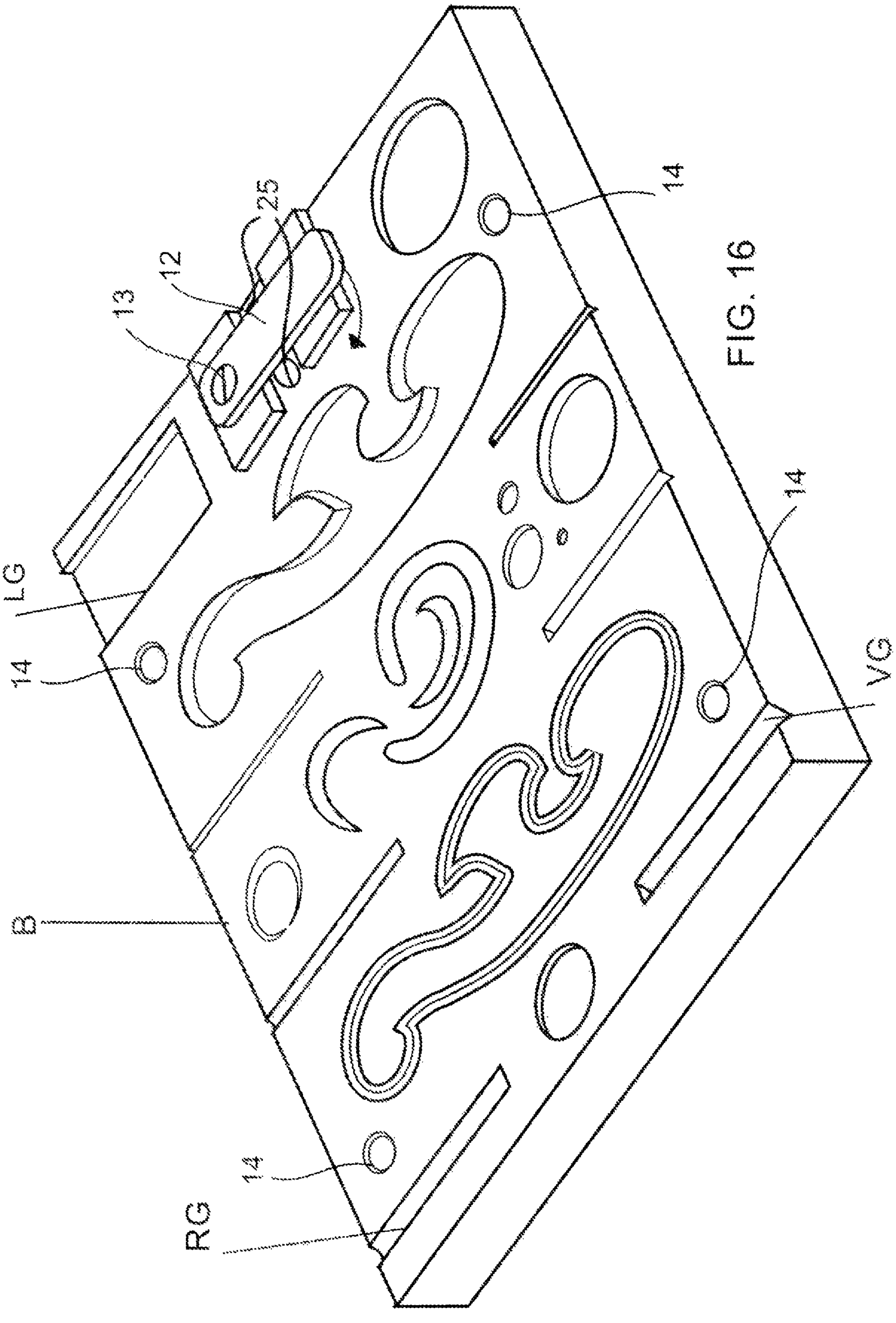

FIG. 16 is a perspective view of the embodiment of engraving channel block (B)-cum-Tongs-type tool holder. Block is made of a transparent plastic material. The depth of groove channel is half-round (RG), depth of groove channel is letter 'V' shape (VG), depth of the groove in letter 'L' shape (LG), screw (13), metal plate (12), four through countersunk holes (14).

Figure 17:
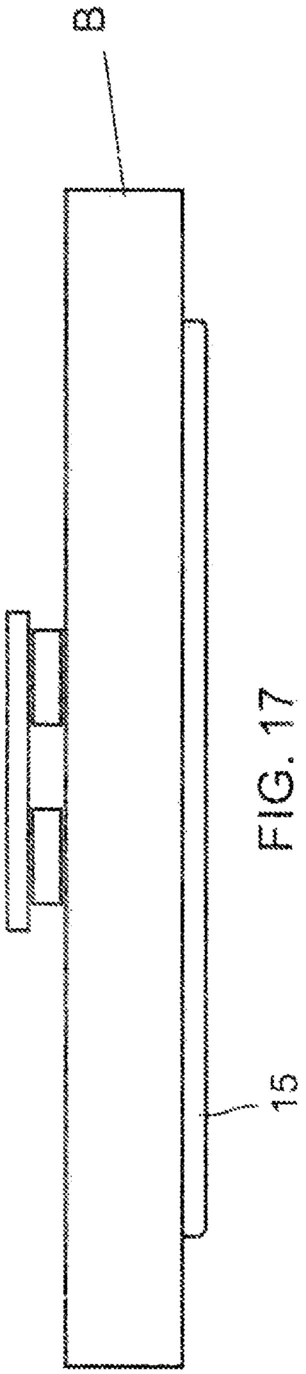

FIG. 17 is a front side view of the embodiment of FIG. 16 showing nonskid synthetic rubber-base strip (15). The backside view is the same as or mirrors the front side view.

Figure 18:
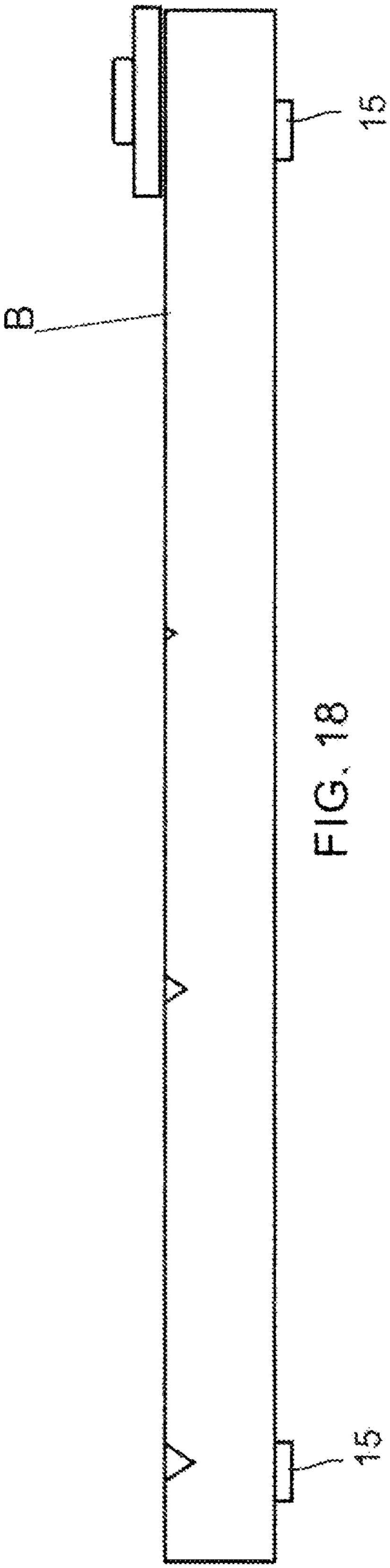

FIG. 18 is a Right side view of an embodiment of FIG. 16 showing a letter "V"-shaped channel groove (VG).

Figure 19:
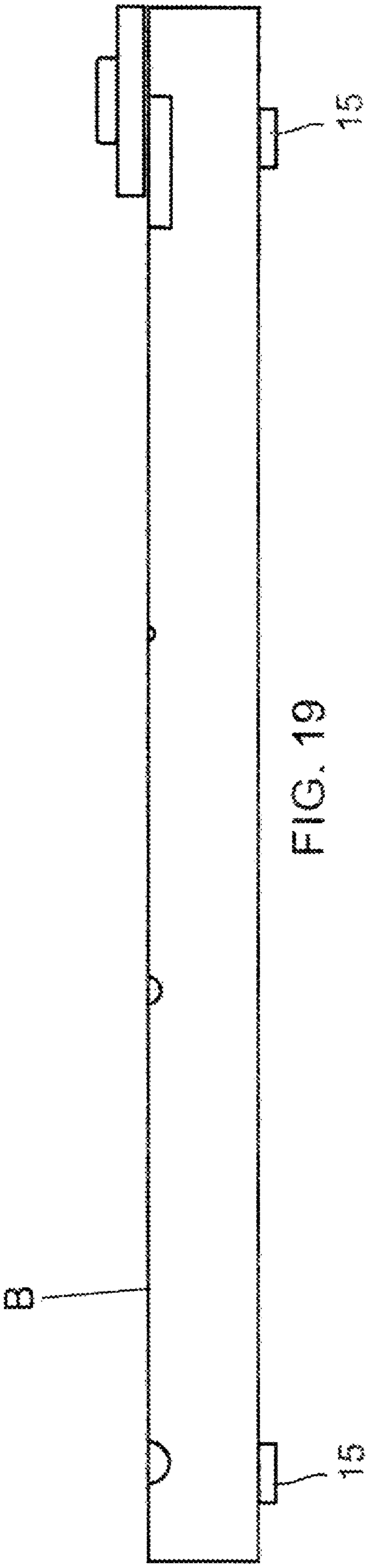

FIG. 19 is a Left side view of an embodiment of FIG. 16 showing a half-round shape channel groove (RG).

Figure 20:
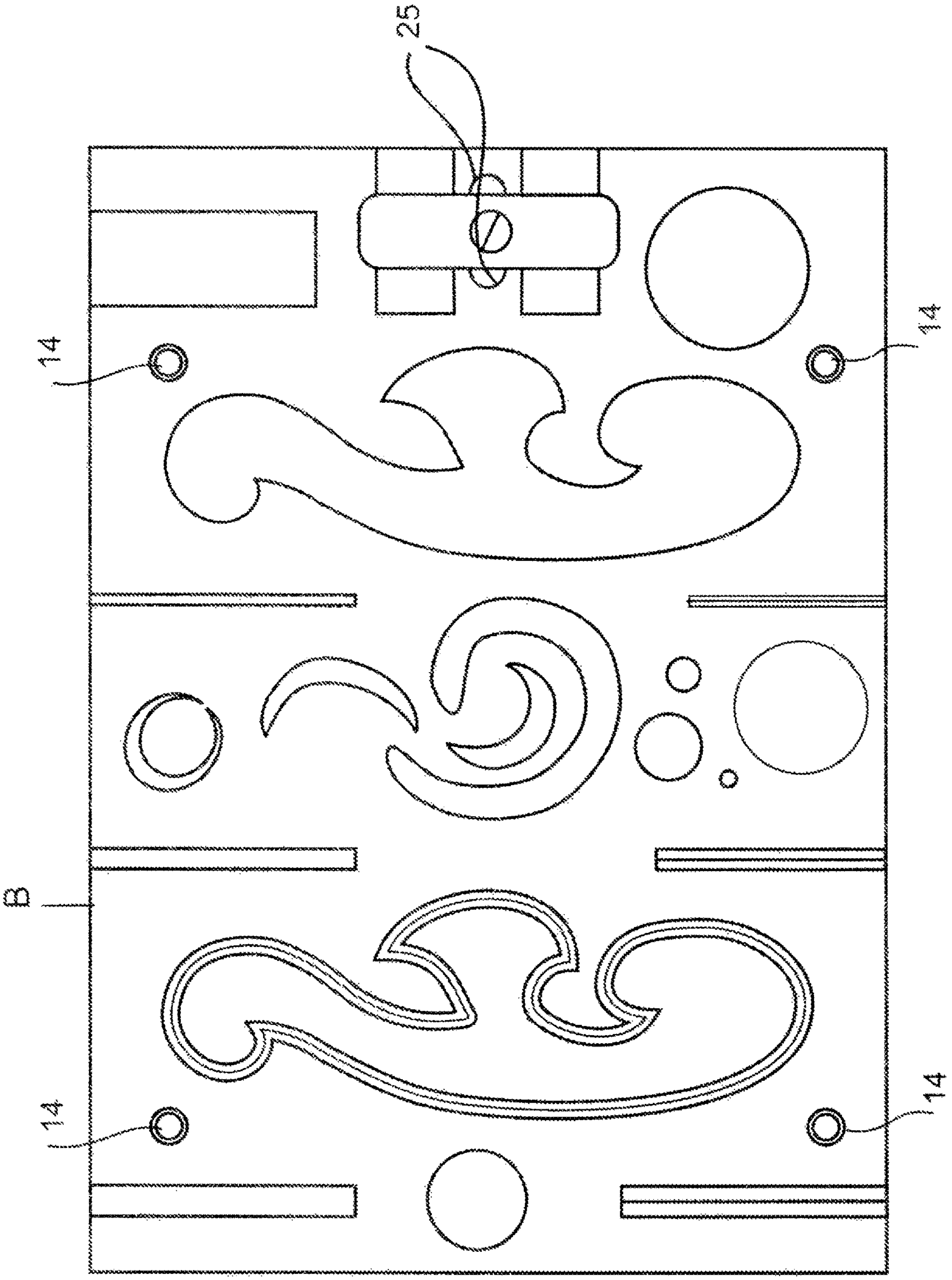

FIG. 20 is a top view of an embodiment of FIG. 16 showing a printed borderline at the edge of channel groove, printed in transparent color rather than black and white color.

Figure 21:
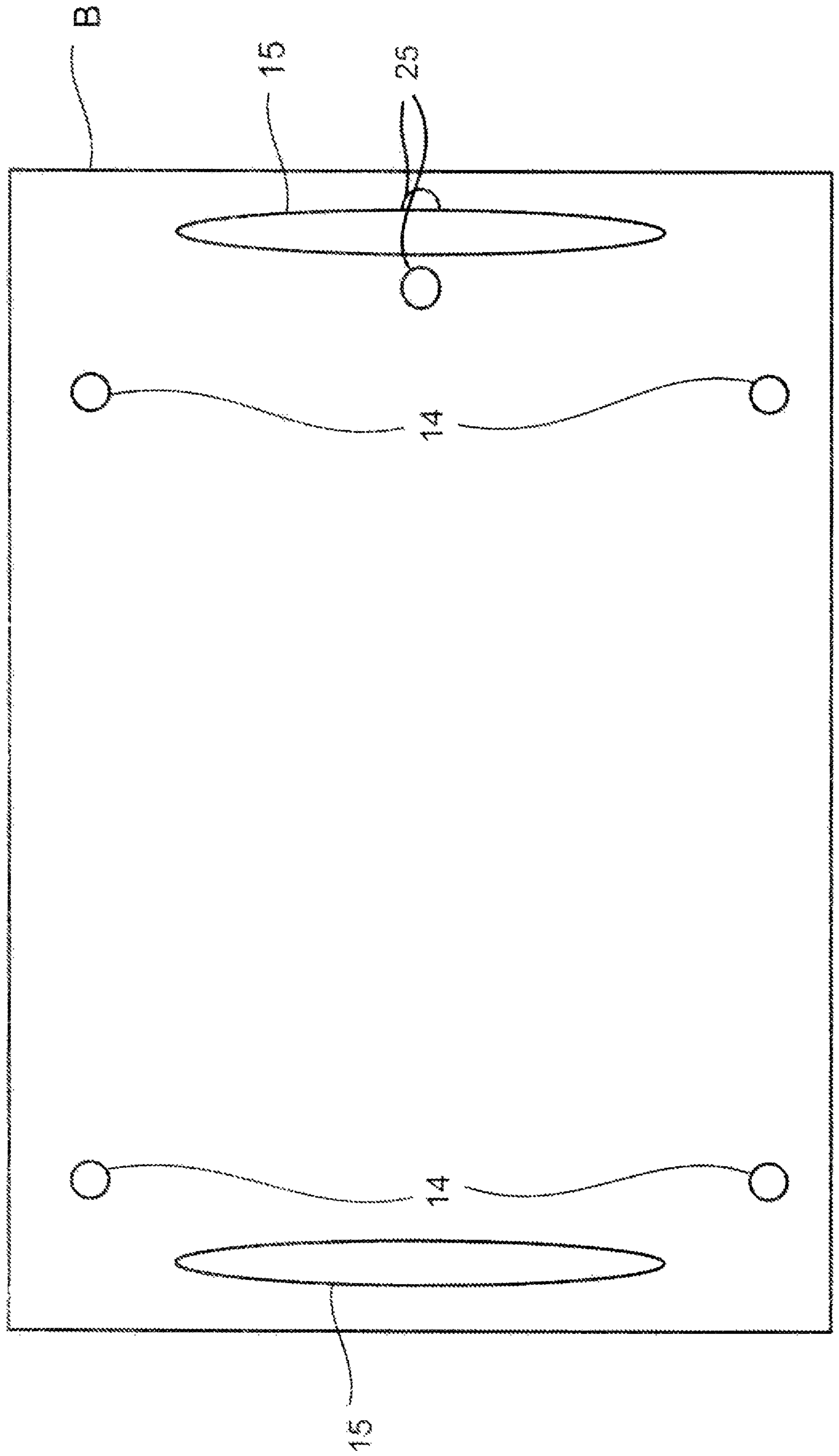

FIG. 21 is a Bottom view of an embodiment of FIG. 16 showing four through-hole (14) nonskid synthetic rubber-base strip (15), two full threaded cylinder hole (25)

Figure 22:
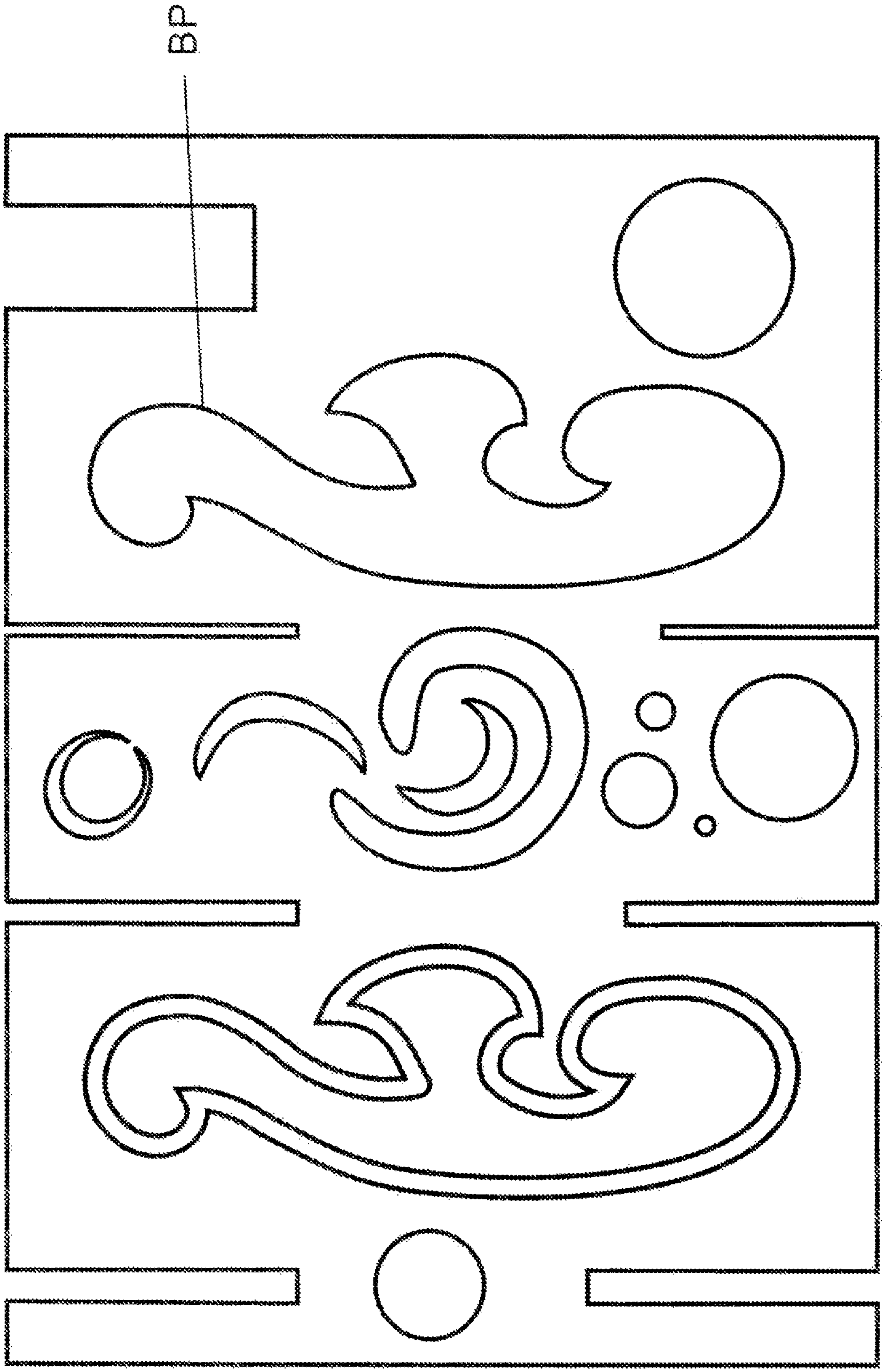

FIG. 22 is a view of color-printing red/blue/green transparent borderline (BP) at the edge of the groove channel.

Figure 23:
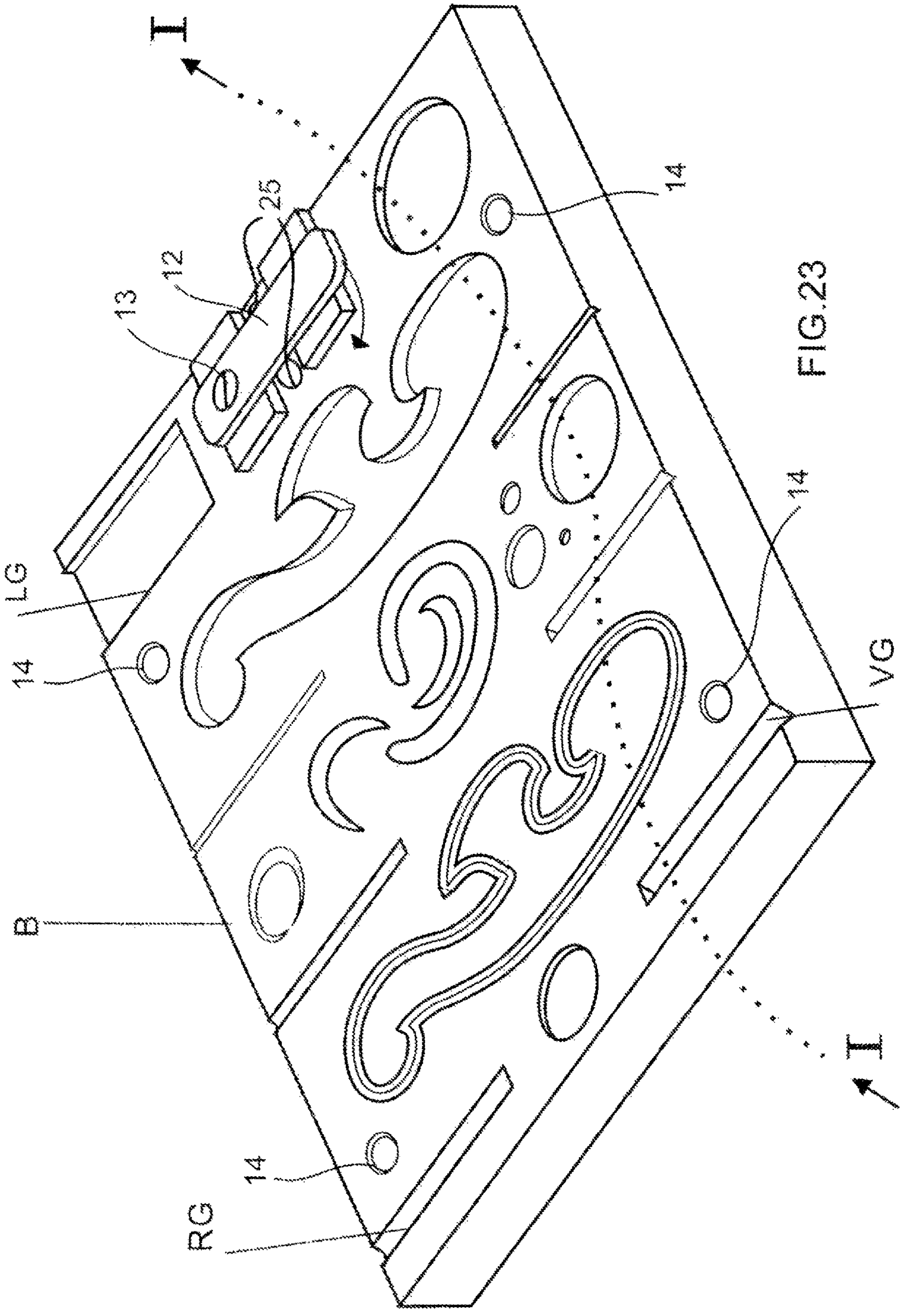

FIG. 23 is a perspective view of an embodiment of FIG. 16. A broken line from (1)* to (II)* is shown from which the engrave block (B) is cut for side cross-section view. Arrows indicate the direction of sight.

Figure 23A:
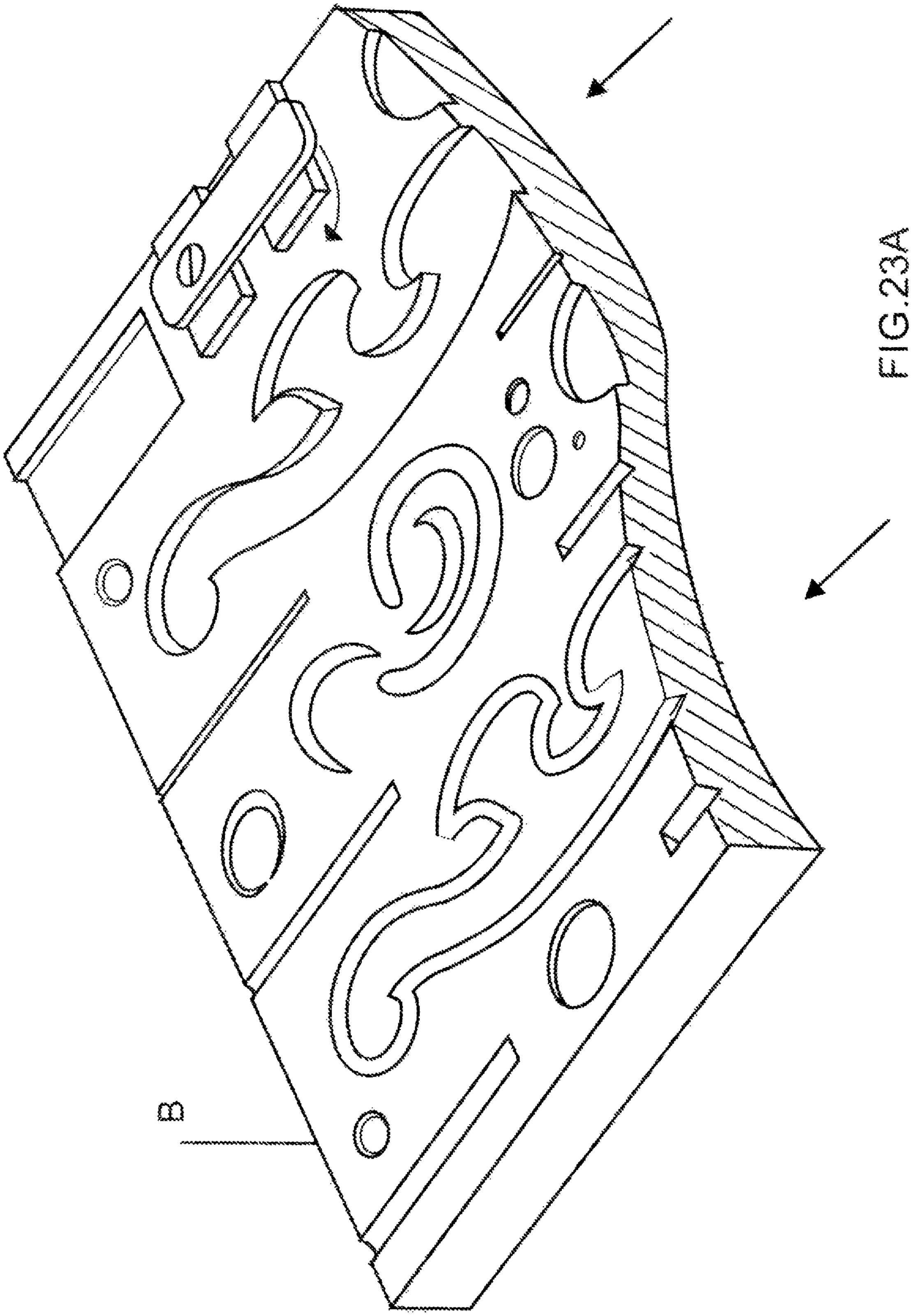

FIG. 23A is a perspective view of an embodiment of FIG. 16 with the arrows indicating the cut sight.

Figure 24A:
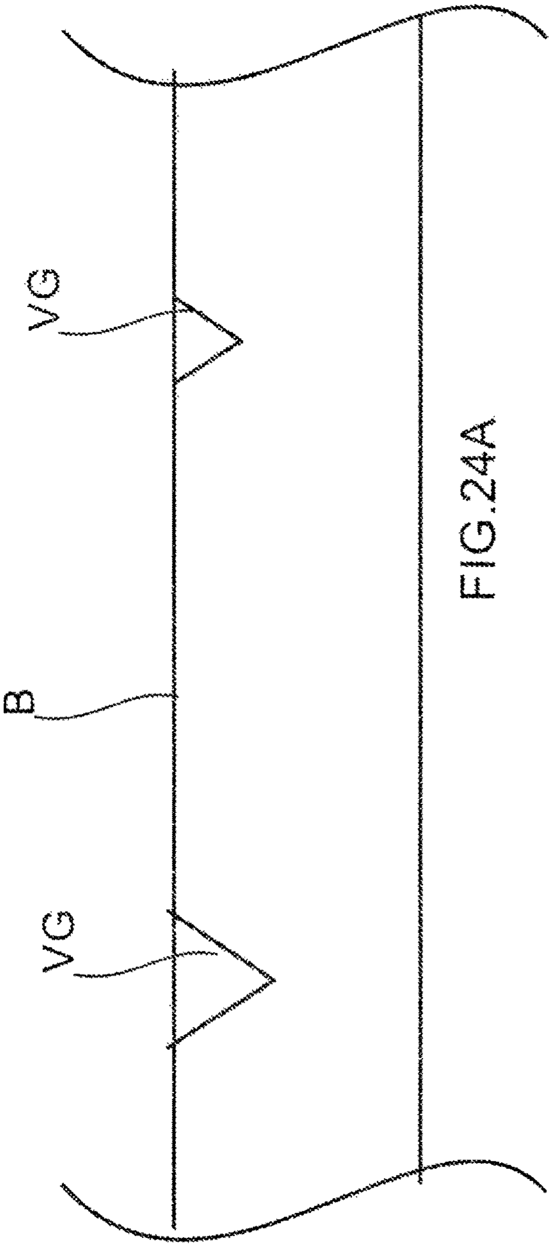
Figure 24:
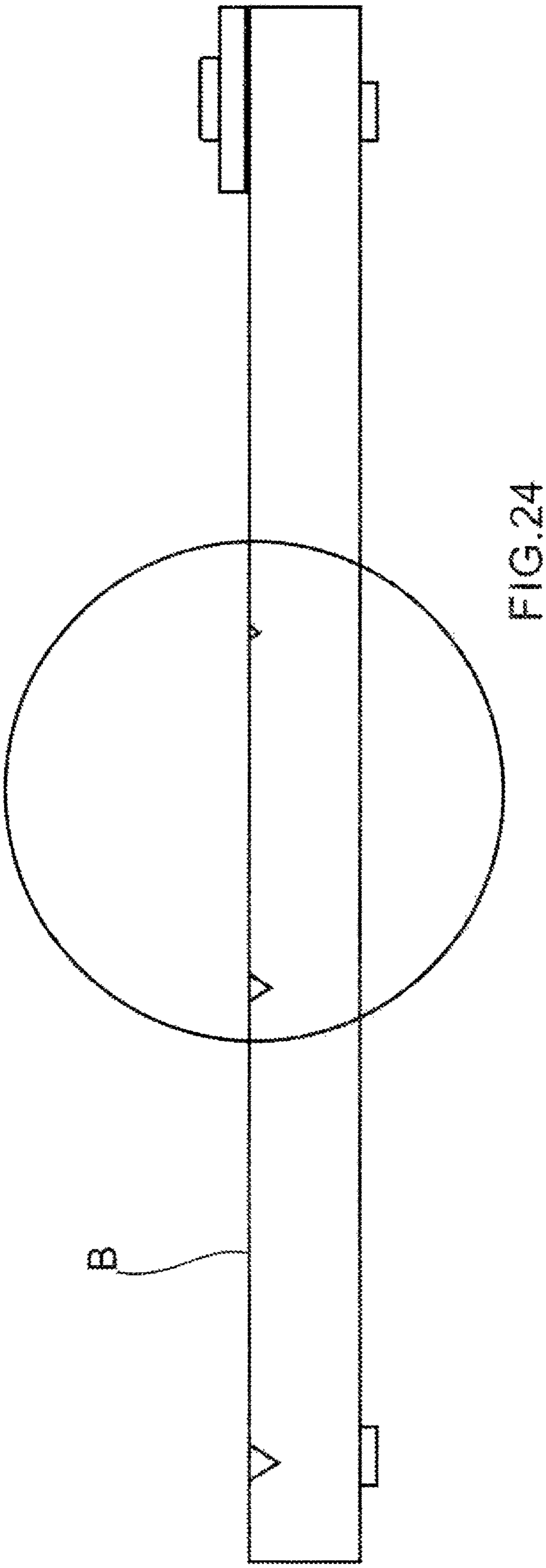

FIG. 24 is a right side view of an embodiment of FIG. 16 showing the portion inside the circle that is enlarged in the next figure.

FIG. 24A is an enlarged view of a selected portion in FIG. 24 showing a detailed view of depth and the letter "V" shape of the groove channel.

Figure 25A:
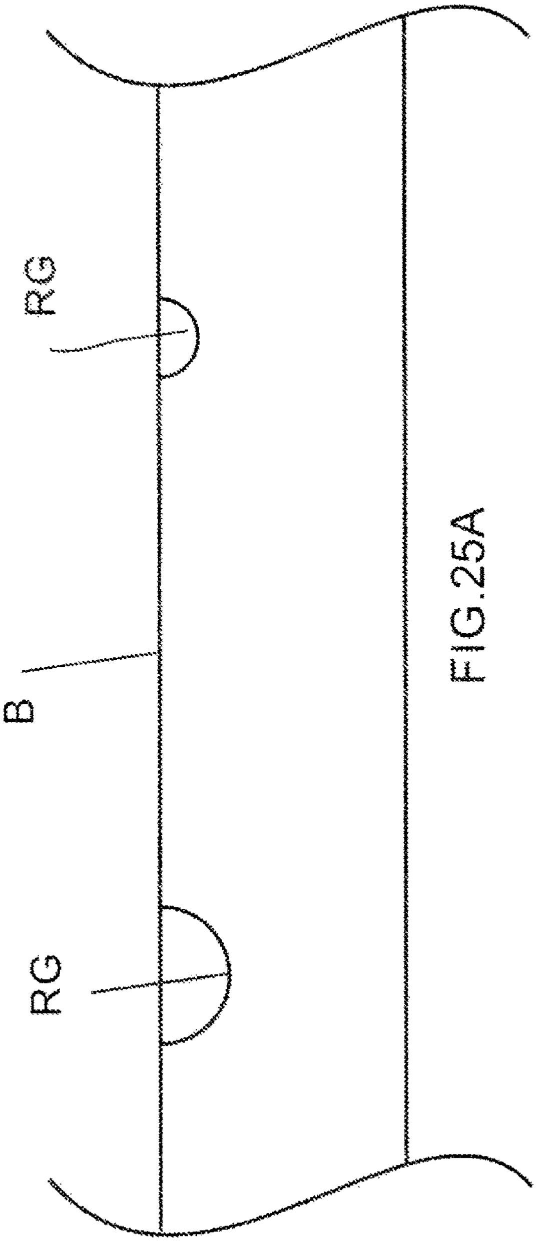
Figure 25:
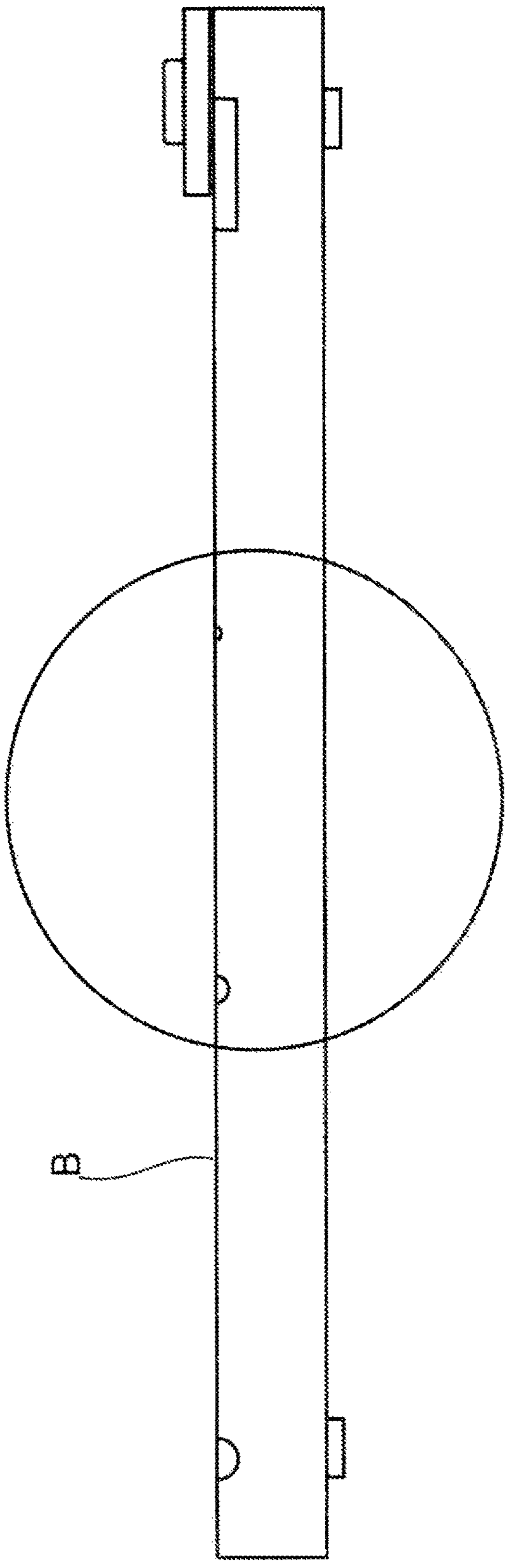

FIG. 25 is a left side view of the engraving block and the portion inside the circle that is enlarged in the next figure.

Figure 26:
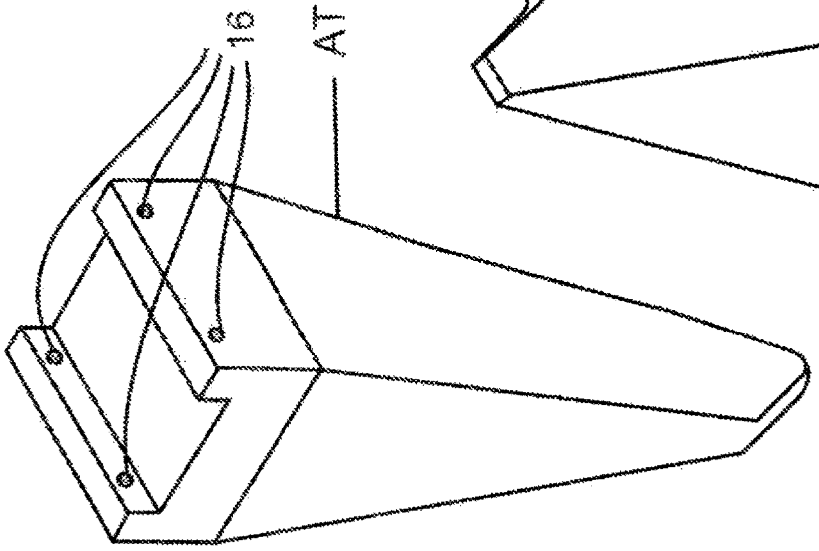

FIG. 25A is an enlarged view of the selected portion of FIG. 25 for a detailed view of the depth and half-round shape of the groove channel FIG. 26 is a perspective view of the upper attachable embossing tips (AT) of letter 'V' shape, having four through threaded holes (16) at the other end of the tips.

Figure 27:
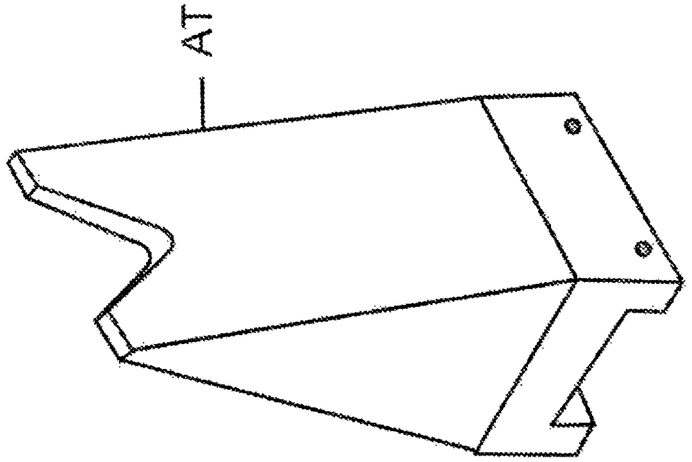

FIG. 27 is a perspective view of the lower attachable embossing tips (AT) of letter 'V' shape, having four through threaded holes (16) at the other end of the tips.

Figure 28:
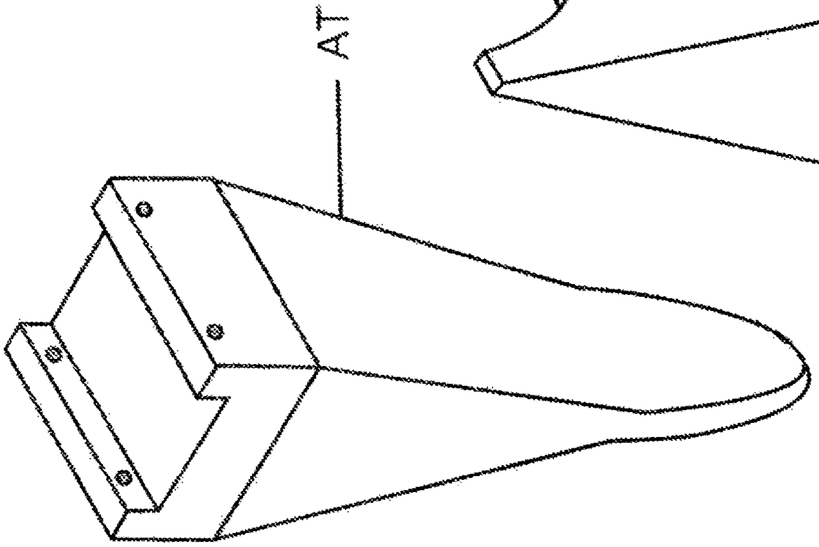

FIG. 28 is a perspective view of the upper attachable embossing tips (AT) of Half-round shape, having four through threaded holes (16) at the other end of the tips.

Figure 29:
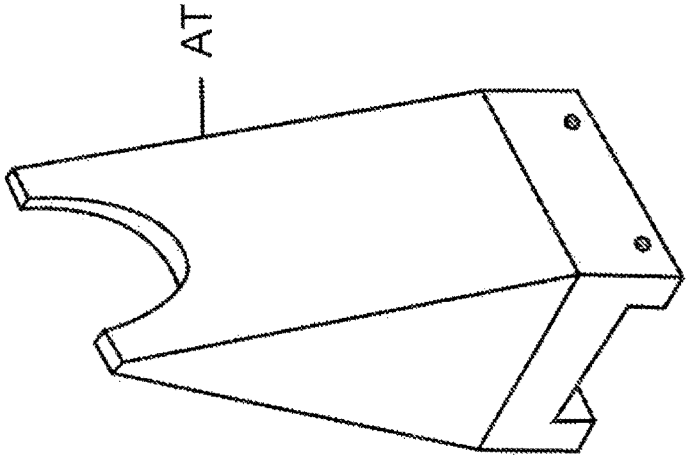

FIG. 29 is a perspective view of the lower attachable embossing tips (AT) of Half-round shape, having four through threaded holes (16) at the other end of the tips.

Figure 30:
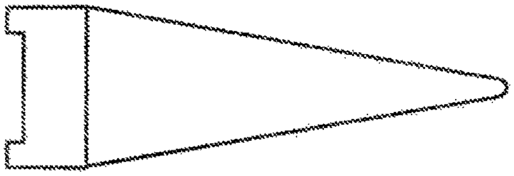

FIG. 30 is a front side view of the upper tip of half-round shape with attachable embossing tips (AT). The backside view is the same as or mirrors the front side view.

Figure 31:
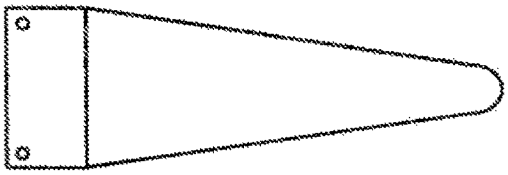

FIG. 31 is a right side view of the upper tip of half-round shape with attachable embossing tips (AT). The left side view is the same as or mirrors the right side view.

Figure 32:
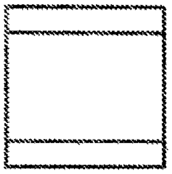

FIG. 32 is a top view of the upper tip of half-round shape with attachable embossing tips (AT).

Figure 33:
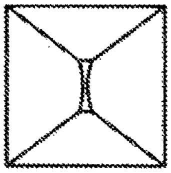

FIG. 33 is a bottom view of the upper tip of half-round shape with attachable embossing tips (AT).

Figure 34:
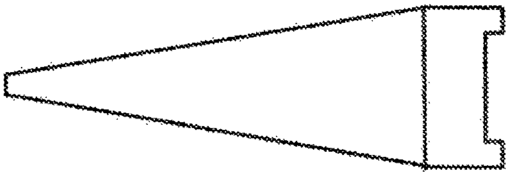

FIG. 34 is a front side view of the lower tip of half-round shape with attachable embossing tips (AT). The backside view is the same as or mirrors the front side view.

Figure 35:
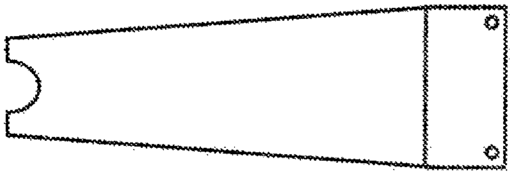

FIG. 35 is a right side view of the lower tip of half-round shape with attachable embossing tips (AT). The left side view is the same as or mirrors the right side view.

Figure 36:
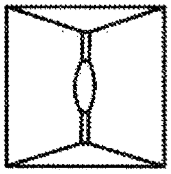

FIG. 36 is a top view of the lower tip of half-round shape with attachable embossing tips (AT)

Figure 37:
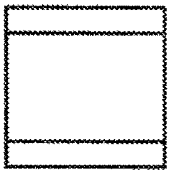

FIG. 37 is a bottom view of the lower tip of half-round shape with attachable embossing tips (AT).

Figure 38:
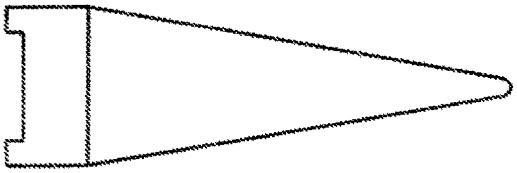

FIG. 38 is a front side view of the upper tip of letter "V" shape with attachable embossing tips (AT). The backside view is the same as or mirrors the front side view.

Figure 39:
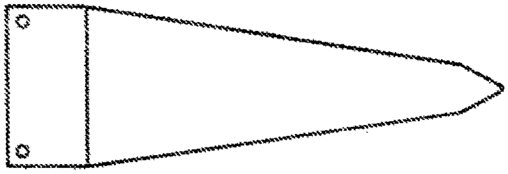

FIG. 39 is a right side view of the upper tip of letter "V" shape with attachable embossing tips (AT). The left side view is the same as or mirrors the right side view.

Figure 40:
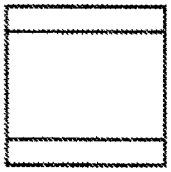

FIG. 40 is a top view of the upper tip of letter "V" shape with attachable embossing tips (AT)

Figure 41:
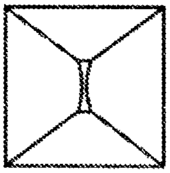

FIG. 41 is a bottom view of the upper tip of "V" shape with attachable embossing tips (AT)

Figure 42:
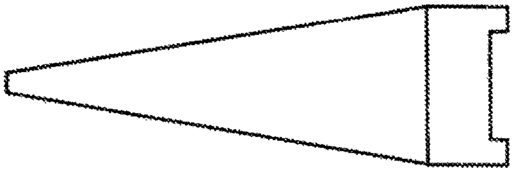

FIG. 42 is a front side view of the lower tip of the letter "V" shape with attachable embossing tips (AT). The backside view is the same as or mirrors the front side view.

Figure 43:
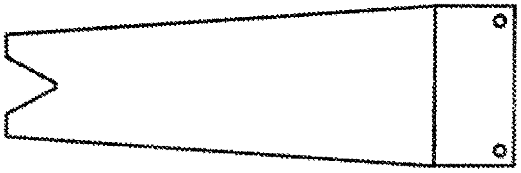
Figure 44:
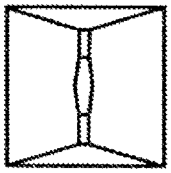

FIG. 43 is a right side view of the lower tip of the letter "V" shape with attachable embossing tips (AT). The left side view is the same as or mirror image of the right side view FIG. 44 is a Top view of the lower tip of the letter "V" shape with attachable embossing tips (AT).

Figure 45:
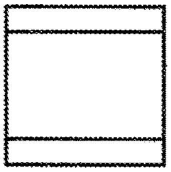

FIG. 45 is a bottom view of the lower tip of the letter "V" shape with attachable embossing tips (AT).

Figure 46:
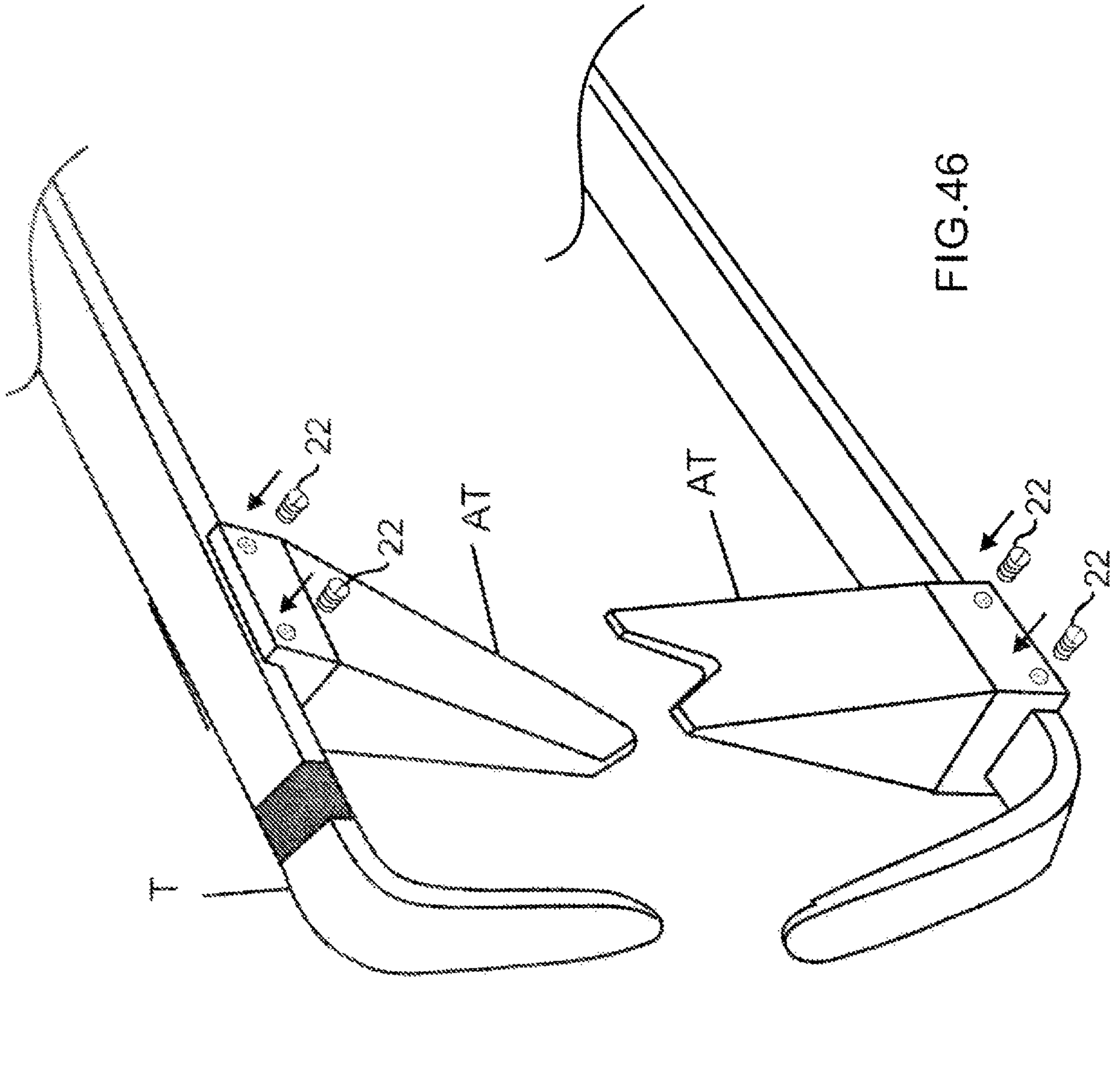

FIG. 46 is a partially enlarged view of the embossing tool where attachable embossing tip (AT) clamp-on tongs-type embossing tool's open span using full threaded no head bolt (22). Arrows show the movement direction of bolts (22).

Figure 47:
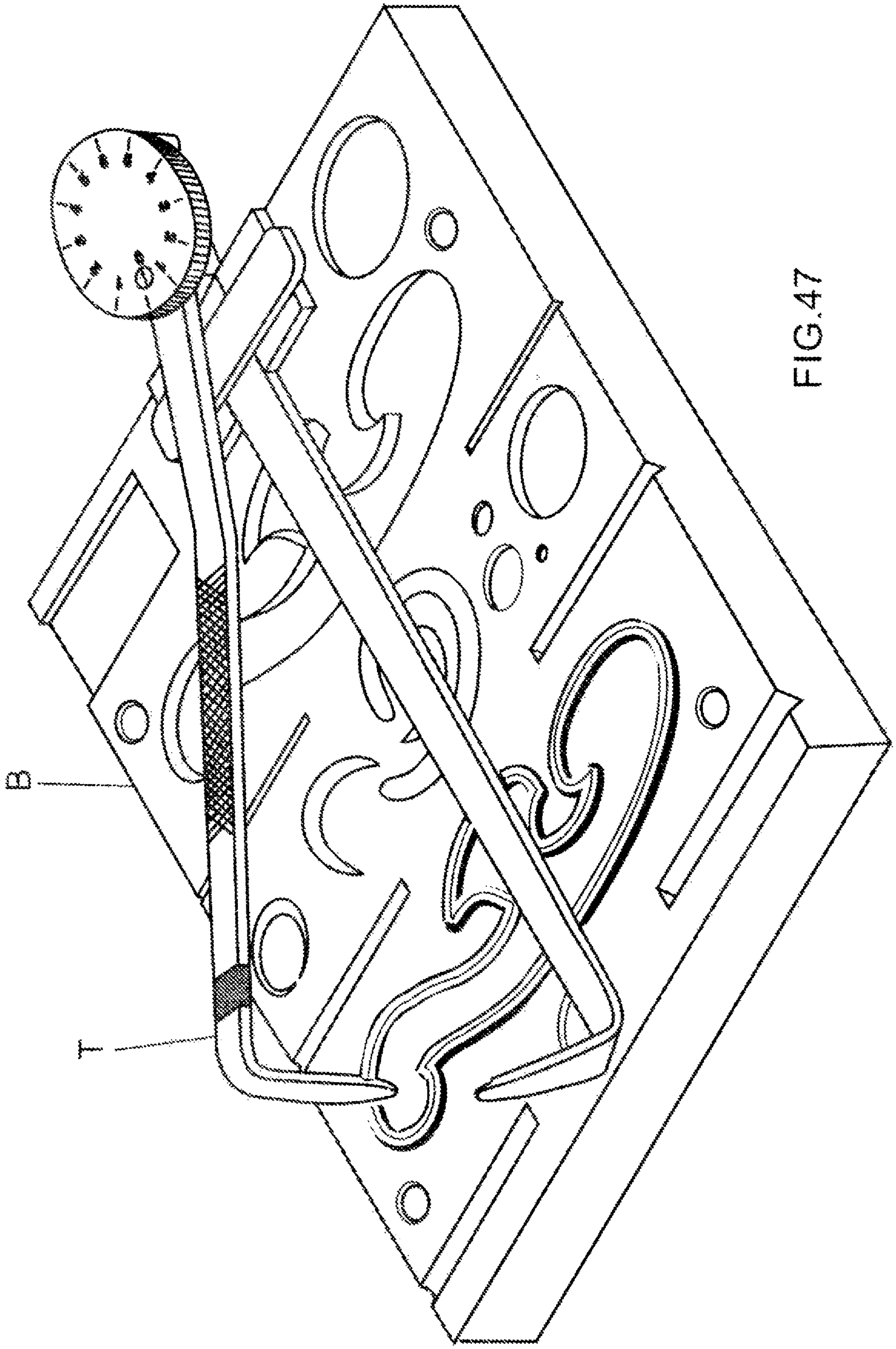

FIG. 47 is a perspective view of an embodiment of FIG. 3 showing the hard metal plate (12) fixed firmly at the edge of the engraving block (3)—cum—tong embossing tool holder (T).

Figure 48:
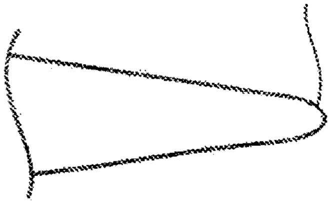

FIG. 48 is a partial enlarged front view of the upper tip (1) of the embossing tool (T). Back view is the same as or mirror image of the front view.

Figure 49:
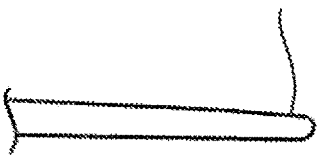
Figure 50:
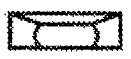

FIG. 49 is a partial enlarge right side view of the upper tip (1) of tongs-type embossing tool (T). Left side view is the same as or mirror image of the right side view FIG. 50 is a partially enlarge bottom view of the tip (1) of tongs-type embossing tool (T).

Figure 51:
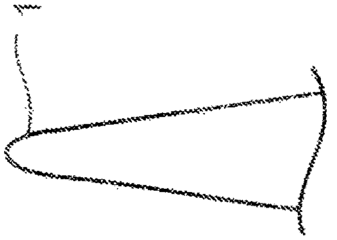

FIG. 51 is a partial enlarge front side view of the lower tip (1) of tongs-type embossing tool (T).

Figure 51A:
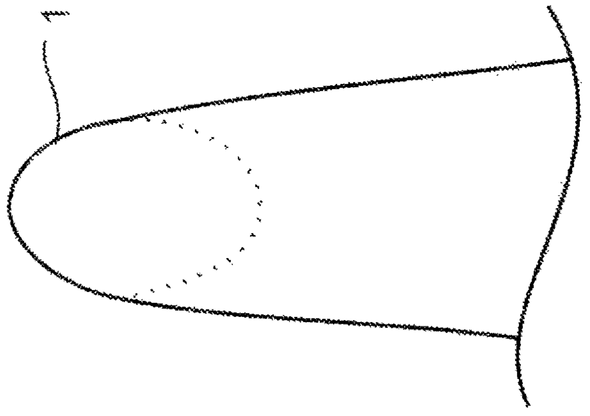

FIG. 51A is a partial enlarge view of the tip (1) of an embodiment of tongs-type embossing tool (T) showing partial curve shape of parabolic or part of the vertically elongated oval shape.

Figure 52:
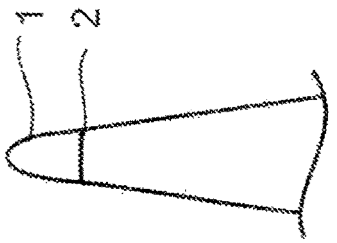

FIG. 52 is a partial enlarge backside view of the lower tip (1) of the embodiment of tongs-type embossing tool (T) having a slot (2)

Figure 53:
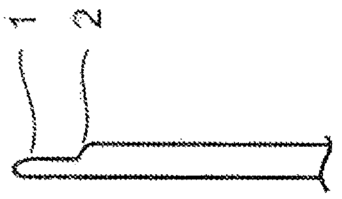

FIG. 53 is a partial enlarge right side view of the lower tip (1) of the embodiment of tongs-type embossing tool (T) having slot (2)

Figure 54:
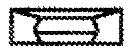

FIG. 54 is a partial enlarge top view of the lower tip (1) of the embodiment of tongs-type embossing tool (T) having a slot (2)

Figure 55:
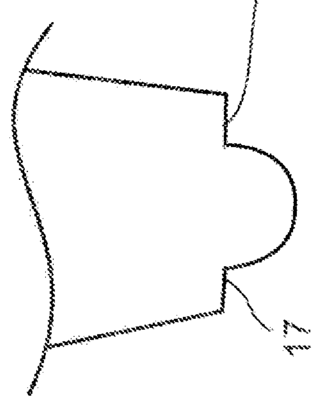

FIG. 55 is a partial enlarge right side view of half-round shape tips of three different types of the stylus. No. 1 is stylus (S), No. 2 is magnetic stainless steel stylus (SS), No. 3 is triangle stylus (TS). Right side view of half-round shape tip with both sides of half-round there is a collar or part of collar (17) which is parallel to the horizontal surface of engraving block. The left side view is the same as or mirror image of the right side view.

Figure 56:
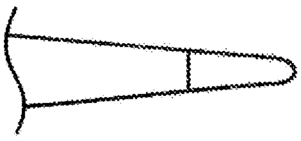

FIG. 56 is a partial enlarged front side view of half-round shape tips of three different types of the stylus, No. 1 stylus (S), No. 2 magnetic stainless steel stylus (SS), No. 3 triangle stylus (TS). Front side view of half-round shape tip with both sides of half-round there is a collar or part of the collar (17) which is parallel to horizontal surface of engrave block (B). The backside view is the same as or mirrors the front side view.

Figure 57:
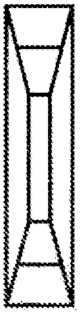

FIG. 57 is a partially enlarged bottom view of half-round shape tips of three different types of the stylus, No. 1 stylus (S), No. 2 magnetic stainless steel stylus (SS), No. 3 triangle stylus (TS). Bottom view of half-round shape tip with both sides of half-round there is a collar or part of collar (17) which is parallel to the horizontal surface of the engraving block (B), No top view, as the top is join with the body of tools.

Figure 58:
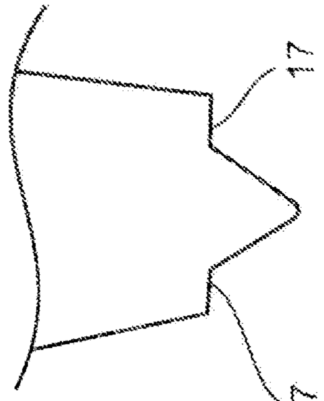

FIG. 58 is a partial enlarge right side view of letter "V" shaped tips of three different types of stylus No. 1 stylus (S), No. 2 magnetic stainless steel stylus (SS), No. 3 triangle stylus (TS). Right side view of the letter "V" shaped tip showing that on both side of "V" shape tip there is a collar or part of collar (17) which is parallel to the horizontal surface of the engraving block (B). The left side view is the same as or mirror image of the right side view.

Figure 59:
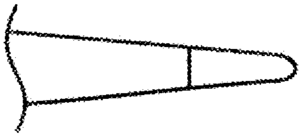

FIG. 59 is a partial enlarge right side view of letter "V" shaped tips of three different types of stylus No. 1 stylus (S), No. 2 magnetic stainless steel stylus (SS), No. 3 triangle stylus. Right side view of the letter "V" shaped tip with both sides of "V" shaped tip there is a collar or part of collar (17) which is parallel to the horizontal surface of the engraving block (B). The left side view is the same as or mirror image of the right side view.

Figure 60:
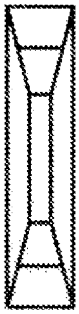

FIG. 60 is a partial enlarge bottom view of letter 'V' shaped tips of three different type of stylus, No. 1 stylus (S), No. 2 magnetic stainless steel stylus (SS), No. 3 triangle stylus (TS). Top view of letter "V" shaped tip with both side of "V" shape tip there is a collar or part of collar (17) which is parallel to horizontal surface of engraving block (B). There is no top view, the top portion is join with the body of tools.

Figure 61:
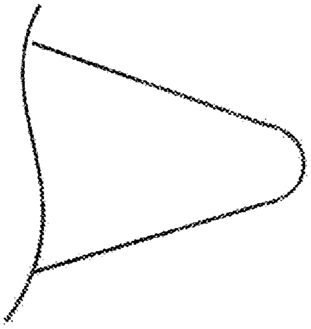

FIG. 61 is a partial enlarge right side view of half-round shaped tips of three different types of the stylus, No. 1 stylus (S), No. 2 magnetic stainless steel stylus (SS), No 3 triangle stylus (TS). Right side view of tip. The left side view is the same as or mirror image of the right side view.

Figure 62:
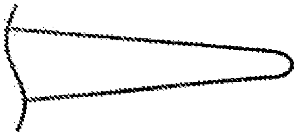

FIG. 62 is a partial enlarged front side view of half-round shaped tips of three different types of the stylus, No. 1 (S), No. 2 magnetic stainless steel stylus (SS), No. 3 triangle stylus (TS). The backside view is the same as or mirrors the front side view.

Figure 63:
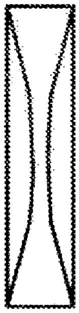

FIG. 63 is a partial enlarged bottom view of half-round shaped tips of three different types of the stylus, No. 1 stylus (S), No. 2 magnetic stainless steel stylus (SS), No. 3 triangle stylus (TS).

Figure 64:
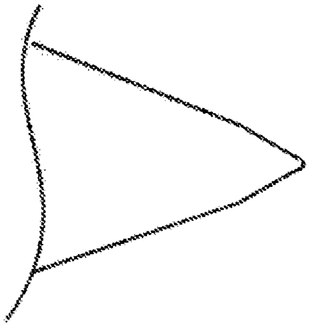
Figure 65:
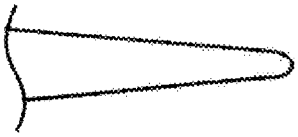

FIG. 64 is a partial enlarged right side view of letter "V" shaped tips of three different type of stylus, No. 1 stylus (S), No. 2 magnetic stainless steel stylus (SS), No. 3 triangle stylus (TS) Left side view is the same as or mirrors the right side view FIG. 65 is a partial enlarged front side view of tips of letter "V" shaped tips of three different types of the stylus, No. 1 stylus (S), No. 2 magnetic stainless steel stylus (SS), No. 3. triangle stylus (TS). The backside view is the same as or mirrors the front side view.

Figure 66:
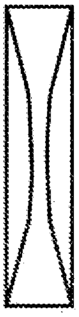

FIG. 66 is a partial enlarged bottom view of letter "V" shaped tips of three different type of stylus, No. 1 stylus (S), No. 2 magnetic stainless steel stylus (SS), No. 3 triangle stylus (TS)

Figure 67:
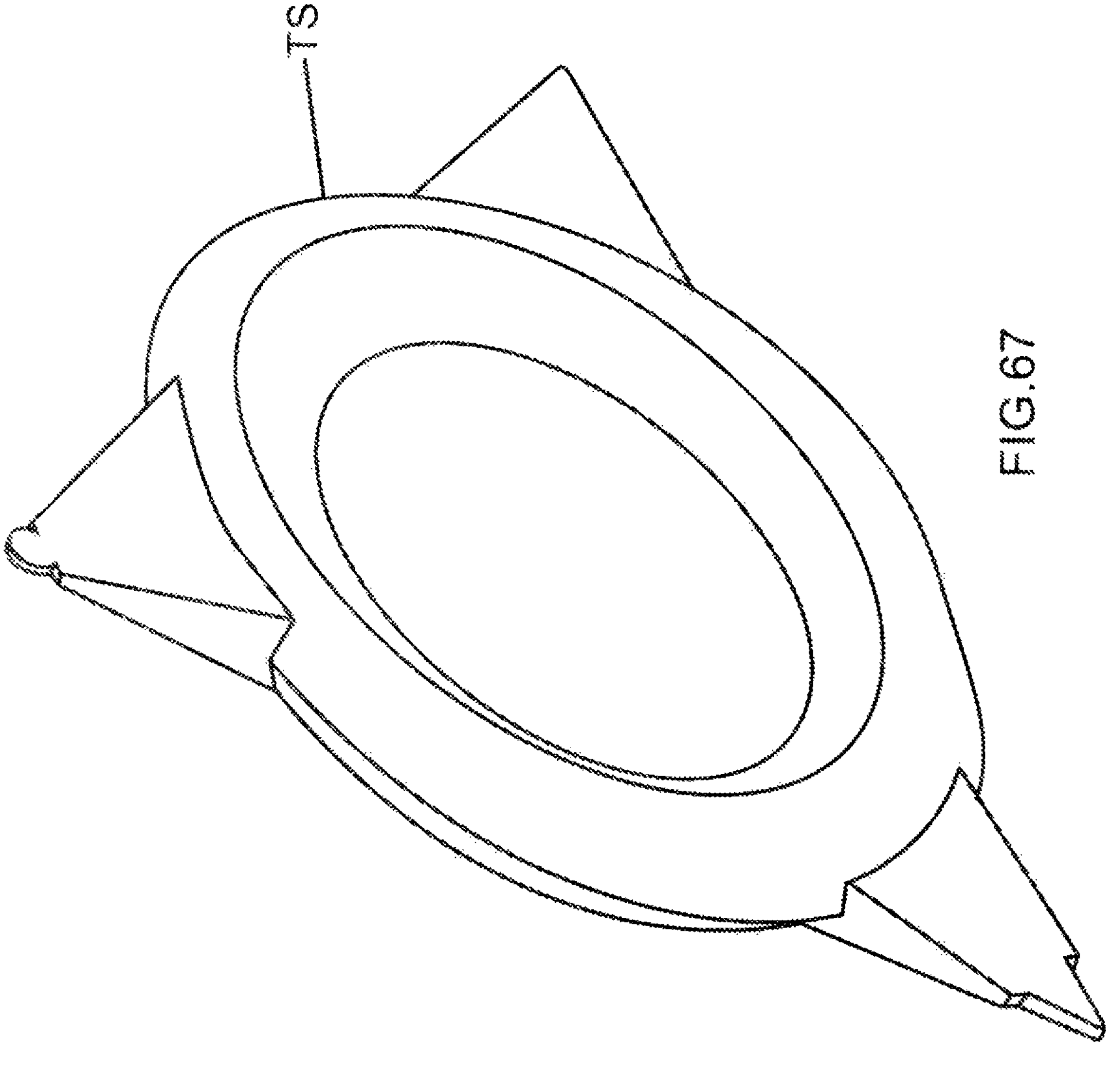

FIG. 67 is a perspective view of the embodiment of Triangle stylus (TS) having letter "V" shaped tips, ball shape socket (BH)

FIG. 68 is a front side view of the embodiment of FIG. 67.

FIG. 69 is a right side view of the embodiment of the FIG. 67. Back view is the same/mirror image.

FIG. 70 is a left side view of the embodiment of FIG. 67 round ball shape socket (BH)

FIG. 71 is a top view of the embodiment of FIG. 67.

FIG. 72 is a bottom view of the embodiment of FIG. 67.

Figure 73:
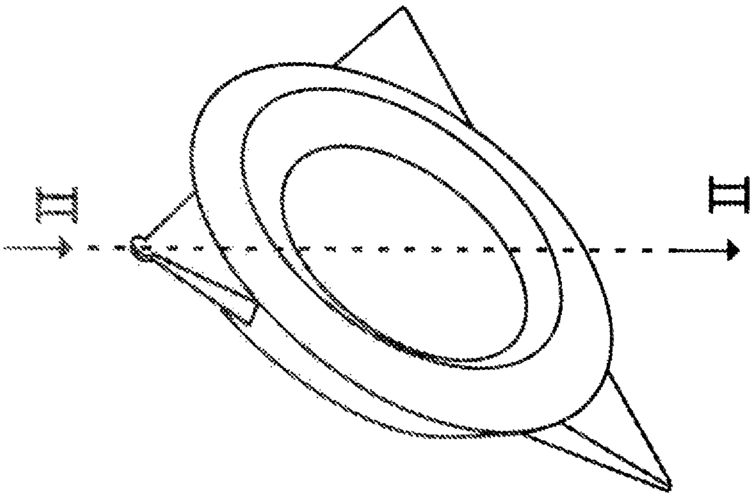
Figure 73A:
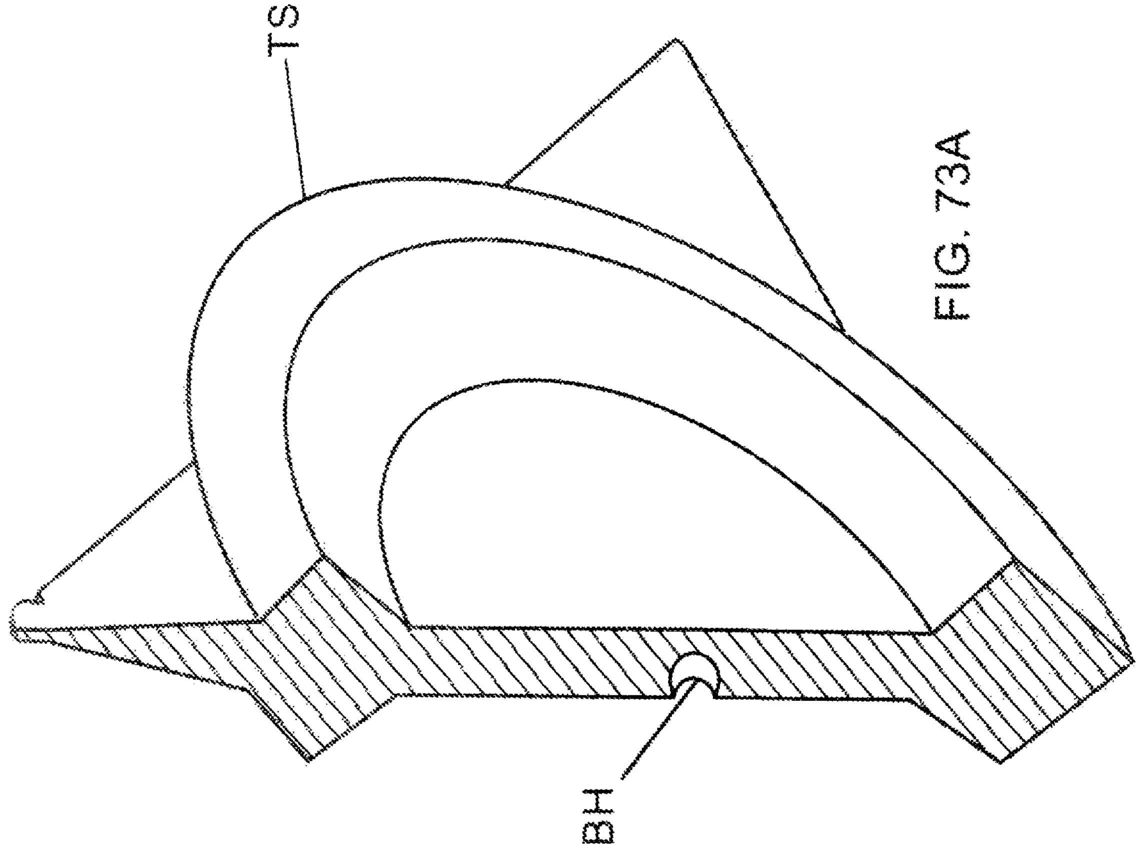

FIG. 73 is a perspective view of the embodiment of FIG. 67. A broken line (II) is shown from which the Triangle stylus (TS) is cut for a cross-section view. Arrows indicate the direction of sight FIG. 73A is a perspective view of the cross-sectional view of the embodiment of FIG. 67. The arrows indicate the cut (21**) sight.

Figure 74:
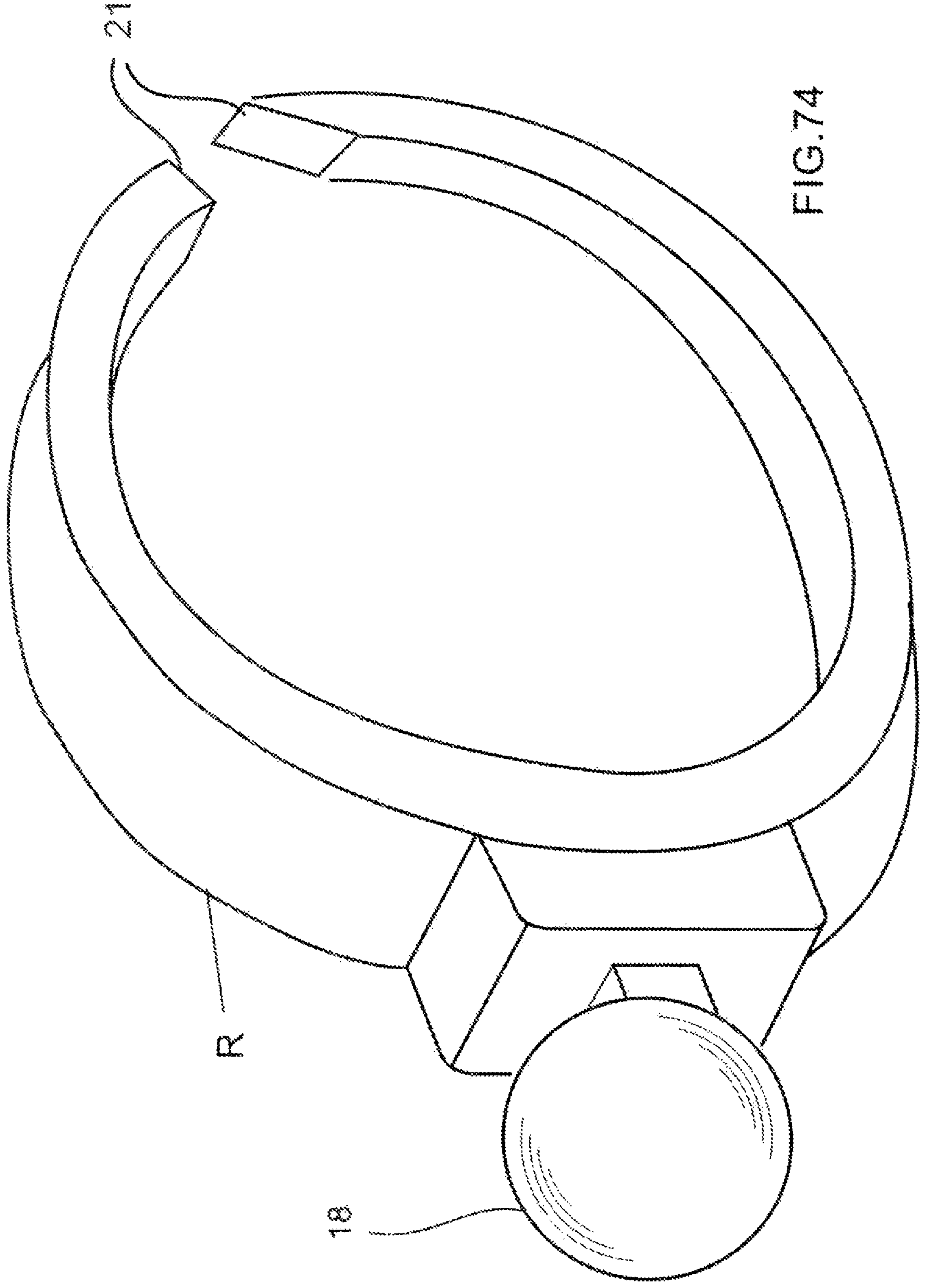

FIG. 74 is a perspective view of the embodiment of Ball head Ring (R) with ball (18) on the head, cut (21) at the backside of the ring portion.

Figure 75:
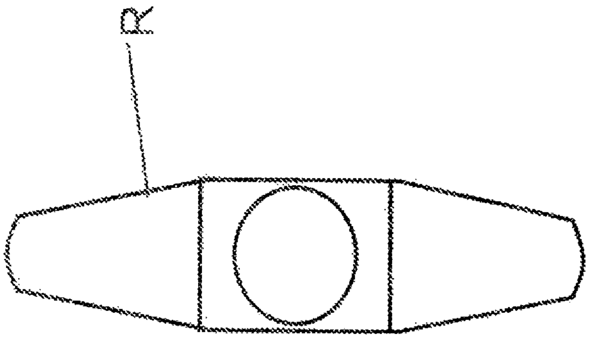

FIG. 75 is a front side view of the embodiment of FIG. 74

Figure 77:
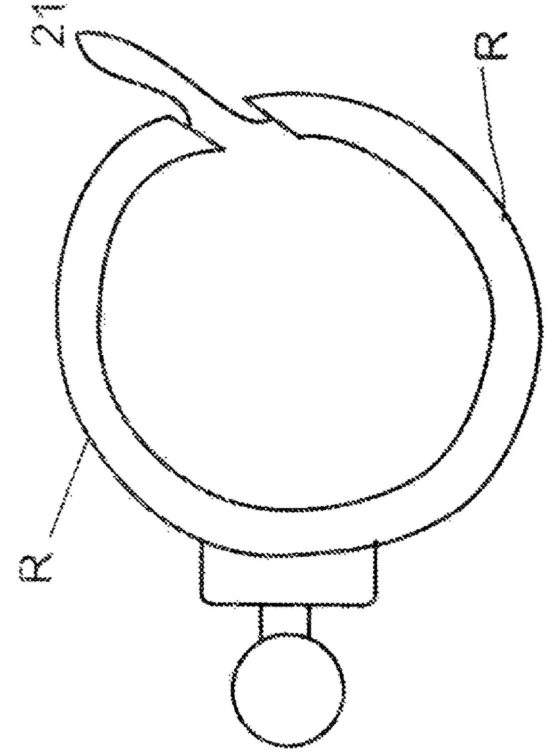
Figure 78:
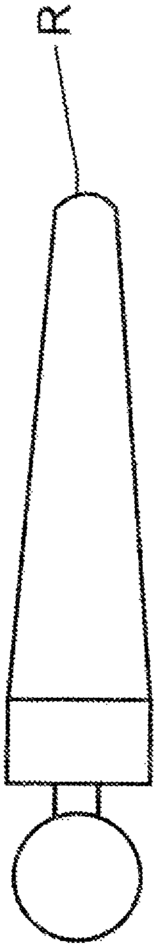
Figure 76:
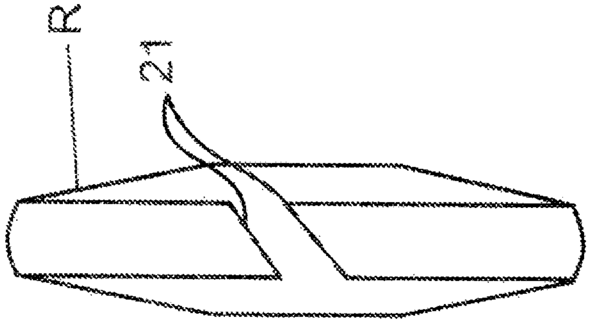
Figure 79:
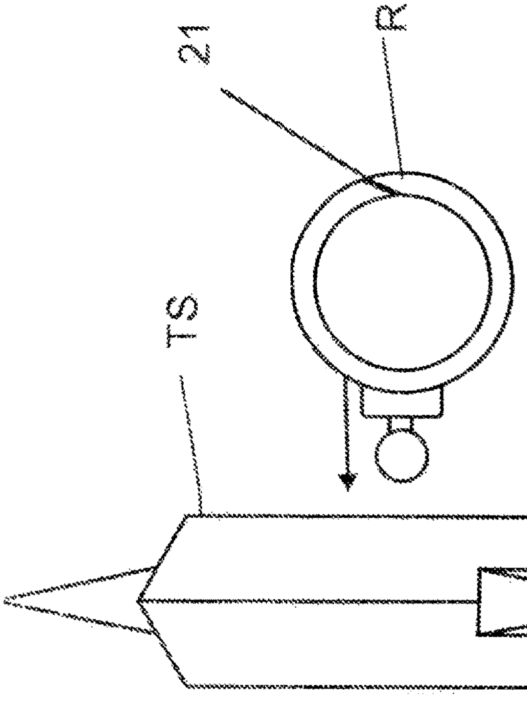

FIG. 76 is a backside view of the embodiment of FIG. 74 open cut (21) at the backside of the ring portion FIG. 77 is a right side view of the embodiment of FIG. 74 open cut (21) at the backside of the ring portion FIG. 78 is a top view of the embodiment of FIG. 74. Bottom side view is same as or mirrors the top view FIG. 79 is a right side view of the assembly line of Triangle stylus (TS) with self-adjustable finger size ball head ring (R). The arrow shows the direction of movement.

Figure 80:
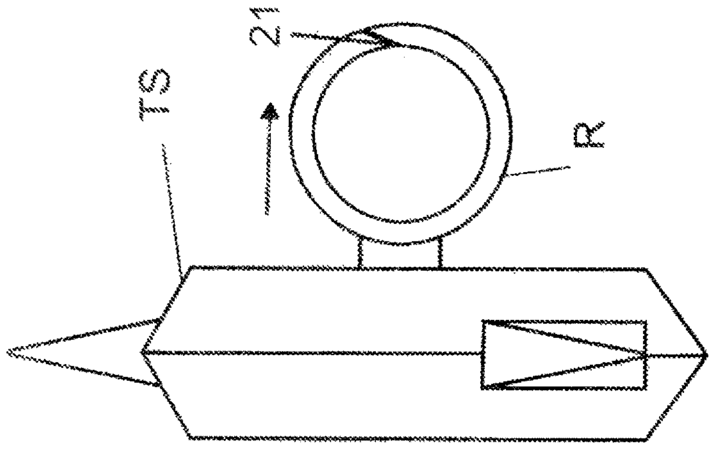

FIG. 80 is a right side view of assembled Triangle stylus (TS) with self-adjustable finger size ball head ring (R)

Figure 81:
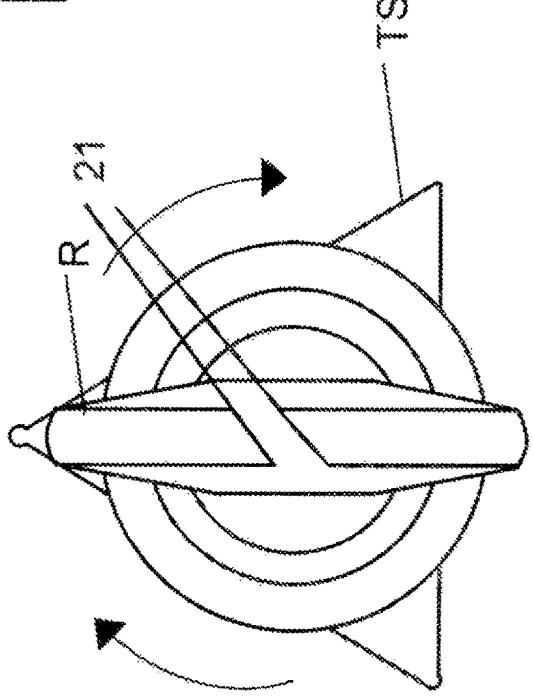

FIG. 81 is a backside view of assembled Triangle stylus (TS) with self-adjustable finger size ball head ring (R). The arrows show the rotating movement of Triangle stylus. (TS)

Figure 82:
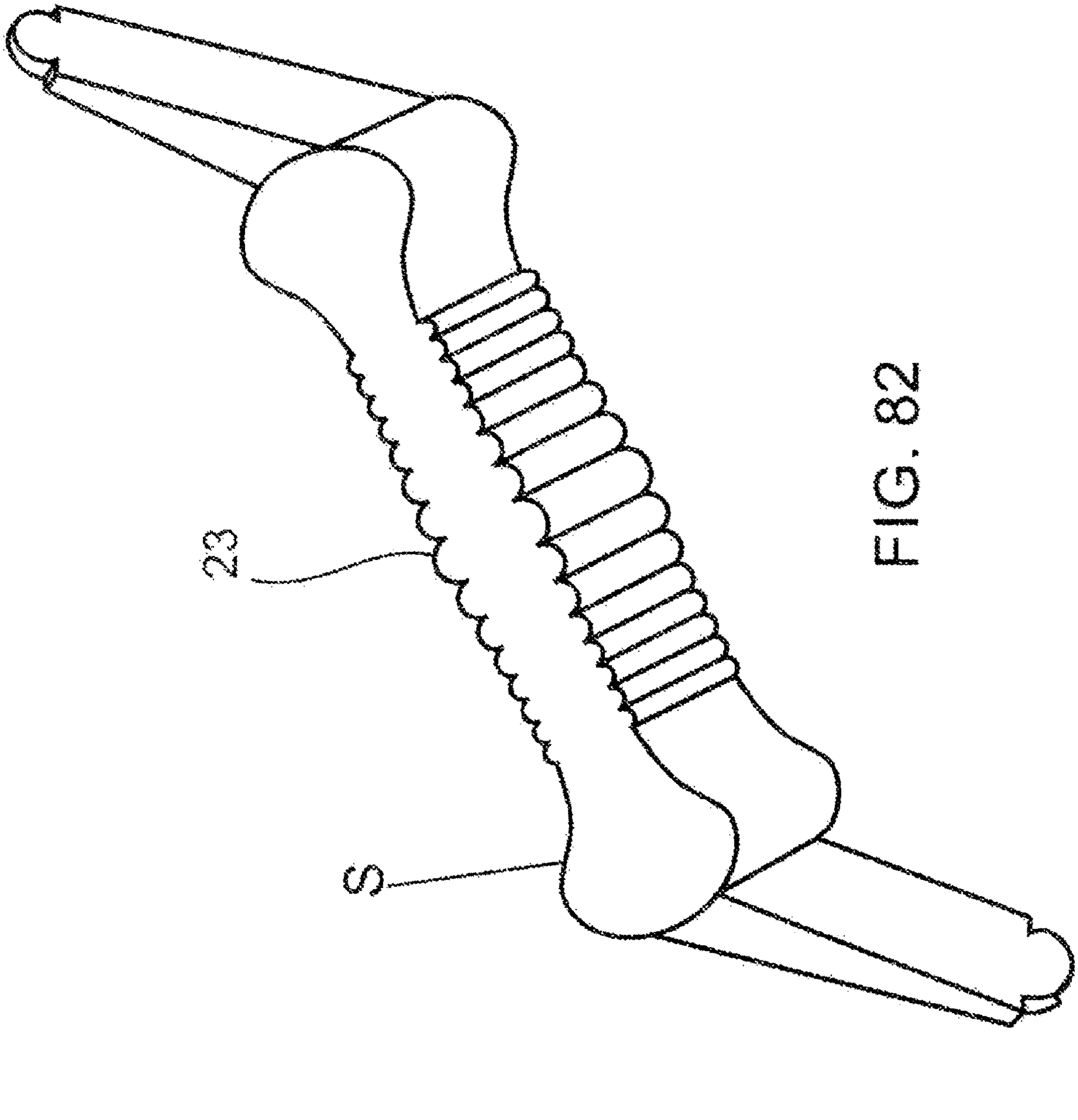

FIG. 82 is a perspective view of the embodiment of plastic stylus. (S) The middle handle (23) has a corrugated shape, stylus point is bent like the letter "Z" shape.

Figure 83:
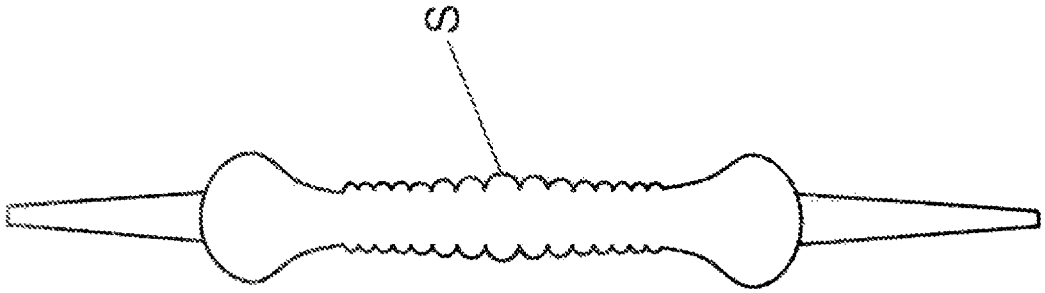

FIG. 83 is a front side view of the embodiment of FIG. 74. Backside view is the same as or a mirror image of the Front view.

Figure 84:
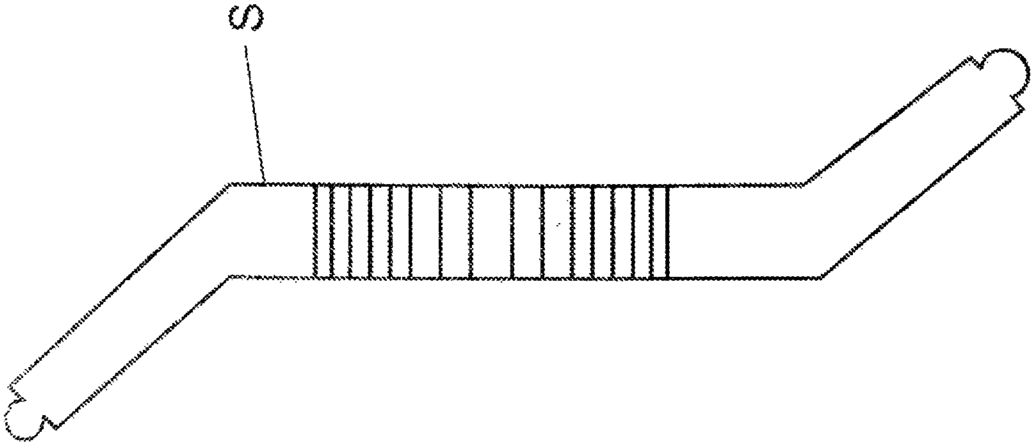

FIG. 84 is a right side view of the embodiment of FIG. 74. Left side view is the same/mirror view as right side view.

Figure 85:
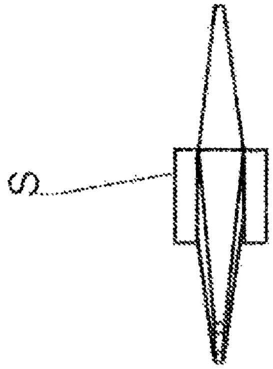

FIG. 85 is a top view of the embodiment of FIG. 74.

Figure 86:
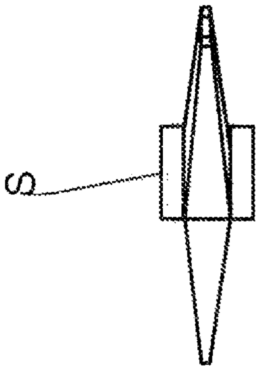

FIG. 86 is a Bottom view of the embodiment of FIG. 74

Figure 87:
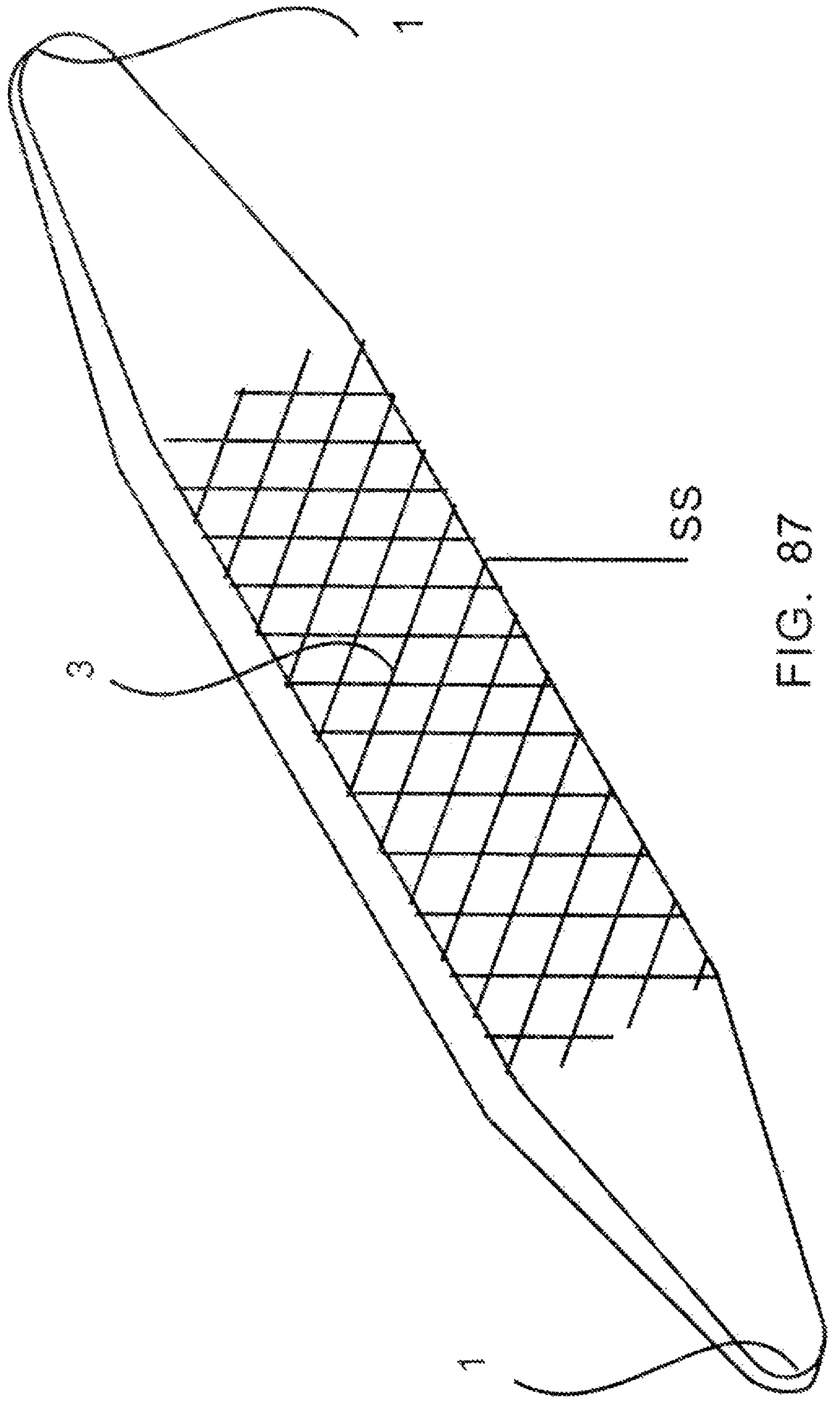

FIG. 87 is a perspective view of the embodiment of an elongated magnetic stainless steel/ferrous metal stylus (SS). has half-round tips. (1), knurling (3)

Figure 88:
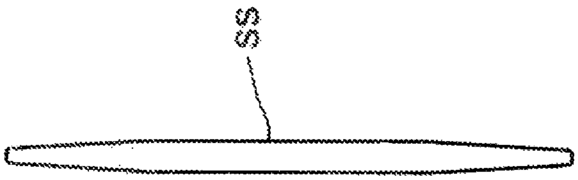

FIG. 88 is a front side view of the embodiment of FIG. 87 The backside view is the same/mirror view as a Front side view.

Figure 89:
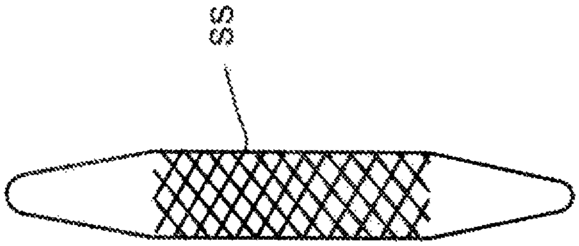

FIG. 89 is a Right side view of the embodiment of FIG. 87. The left side view is the same/mirror view of the Right side view.

Figure 90:

FIG. 90 is a TOP view of the embodiment of FIG. 87.

Figure 91:
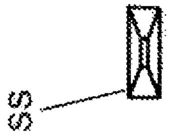

FIG. 91 is a Bottom view of the embodiment of FIG. 74

Figure 92:
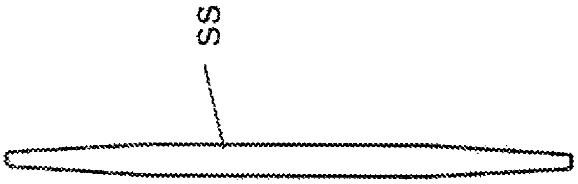

FIG. 92 is a front side view of the embodiment of FIG. 74 The backside view is the same/mirror view as a Front side view.

Figure 93:
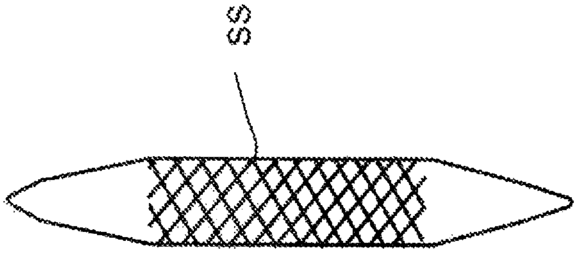

FIG. 93 is a Right side view of the embodiment of FIG. 74 has letter "V" shape tips. The left side view is the same/mirror view of the Right side view.

Figure 94:
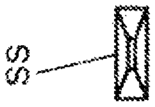

FIG. 94 is a TOP view of the embodiment of FIG. 74 has letter "V" shape tips.

Figure 95:
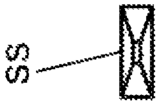

FIG. 95 is a Bottom view of the embodiment of FIG. 74 has letter "V" shape tips.

Figure 96:
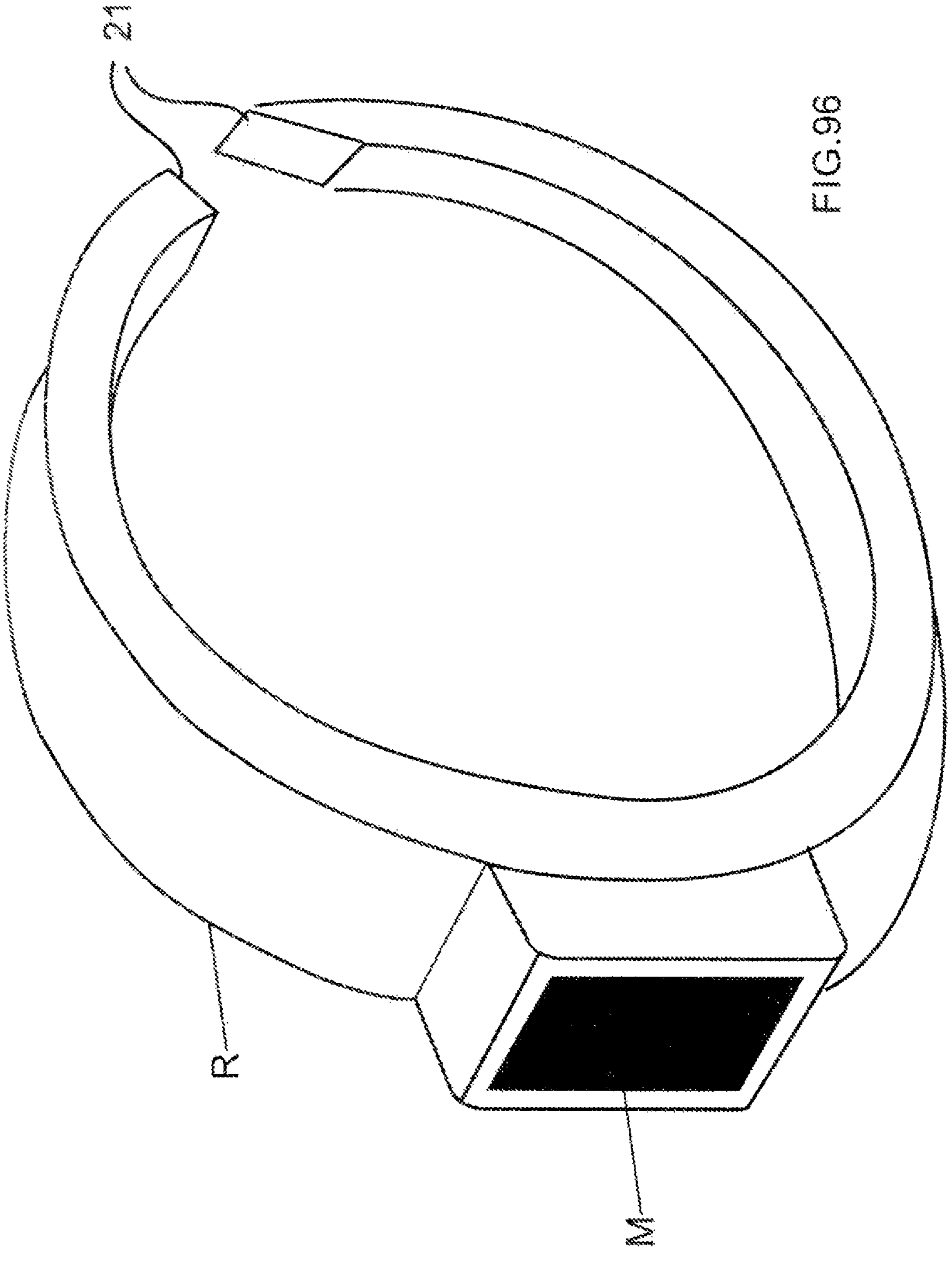

FIG. 96 is a perspective view of embodiments of the magnetic head Ring. (R), magnet (M), cut (21).

Figure 97:
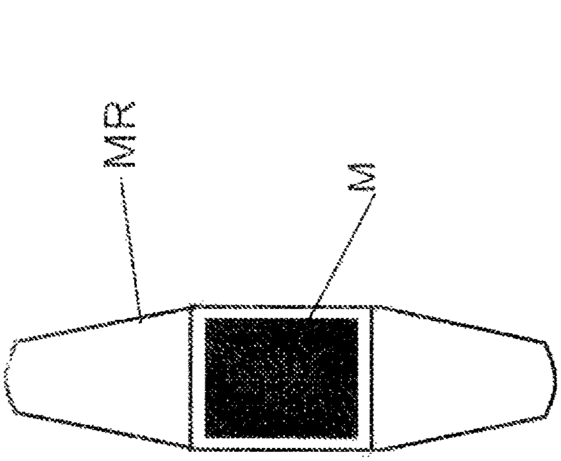

FIG. 97 is a front side view of the embodiment of FIG. 96.

Figure 98:
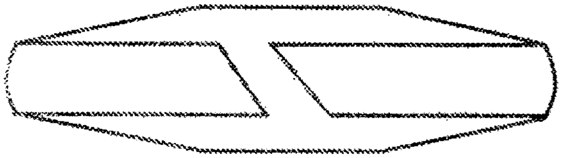

FIG. 98 is a Backside view of the embodiment of FIG. 96.

Figure 99:
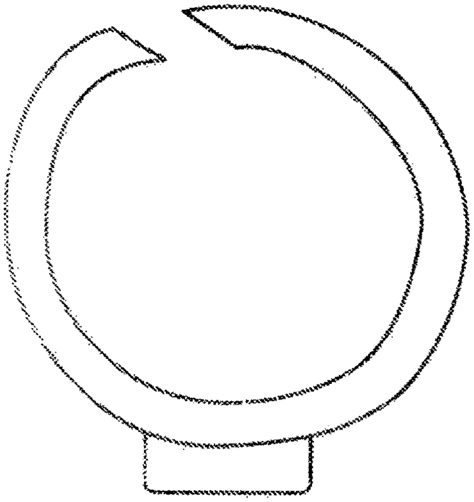

FIG. 99 is a right side view of the embodiment of the FIG. 96 Left side view is the same/mirror view as Right side view.

Figure 100:
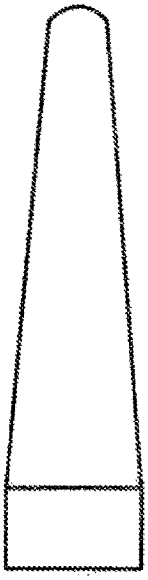

FIG. 100 is a TOP view of the embodiment of FIG. 96. The bottom view is the same/mirror view as Top view.

Figure 101:
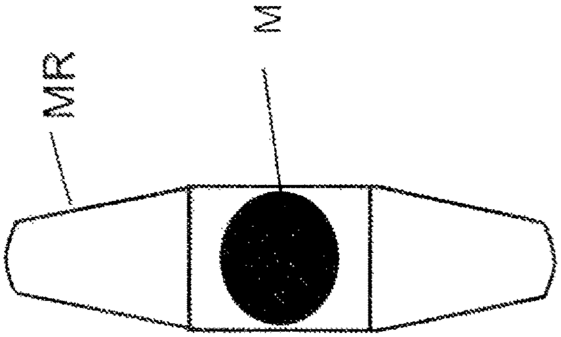

FIG. 101 is a Front side view of the version of the embodiment of FIG. 96 has Round shape Magnet (M).

Figure 102B:
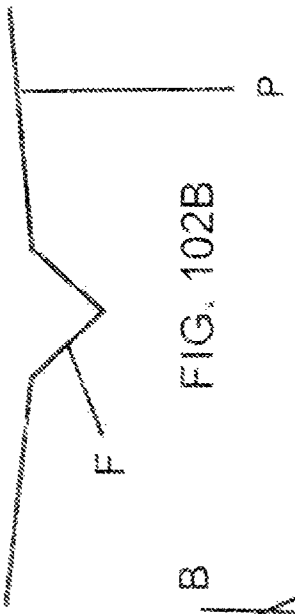
Figure 102:
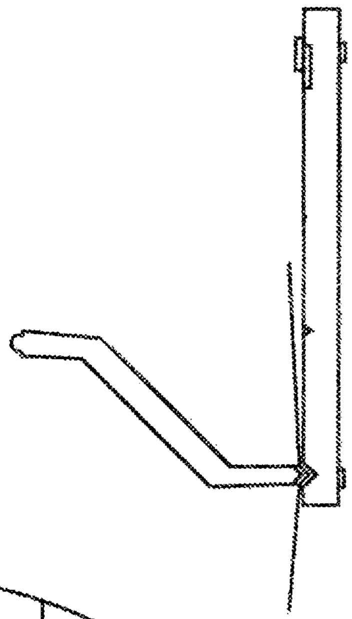

FIG. 102 is a side view of card paper (P) pressed in between engrave block (B)) having "V" shaped channel and stylus (S). using letter "V" shaped tip with side extension (17)

Figure 102A:
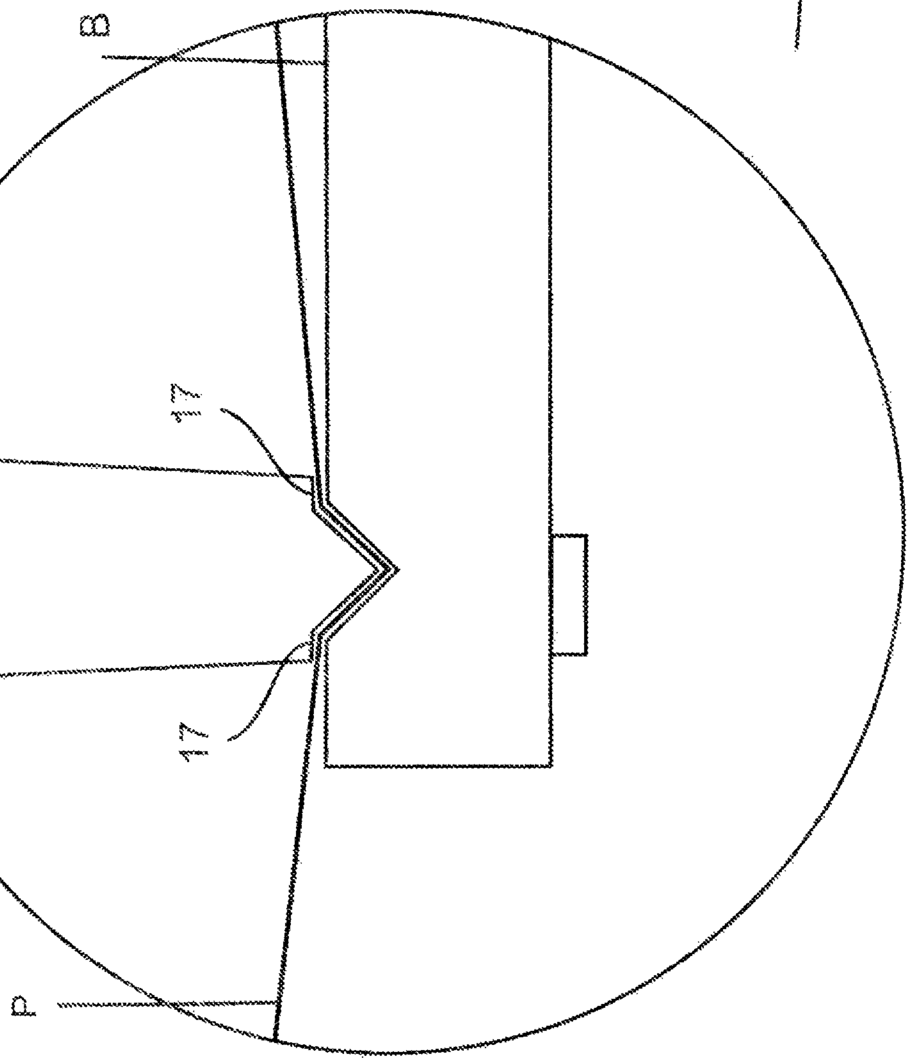

FIG. 102A is an enlarge partial side view of card paper (P) pressed in between engrave block (B) in "V" shaped channel and stylus (S). Tip of letter "V" shape with side extension. (17)

FIG. 102B is a side view of card paper (P) bent (F) creating an embossed line in the letter "V" shape.

Figure 103B:
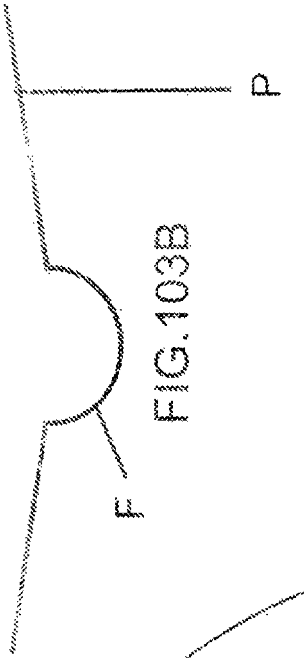
Figure 103:
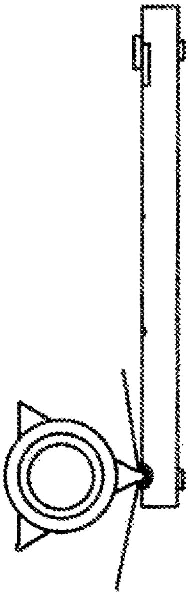

FIG. 103 is a side view of card paper (P) pressed in between engrave block (B) having a half-round shape channel and Triangle stylus's (TS) tip of half-round shape.

Figure 103A:
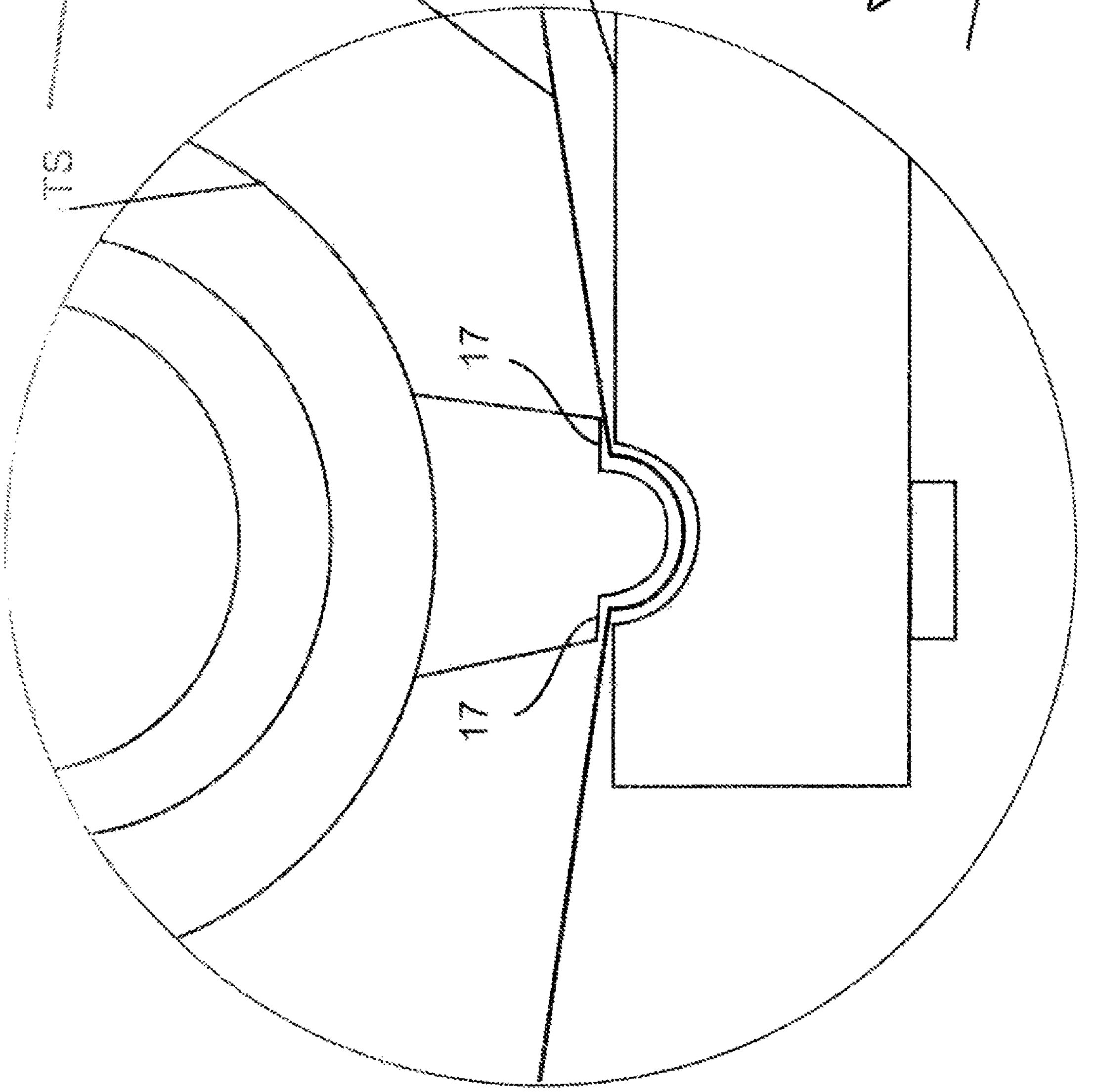

FIG. 103A-FIG. 103B are an enlarged partial side view of card paper (P) pressed in between engrave block (B) in half-round shape channel and Triangle stylus's (TS) tip of half-round shape.

Figures 104, 105, 106, 107, 108, 109, 110:
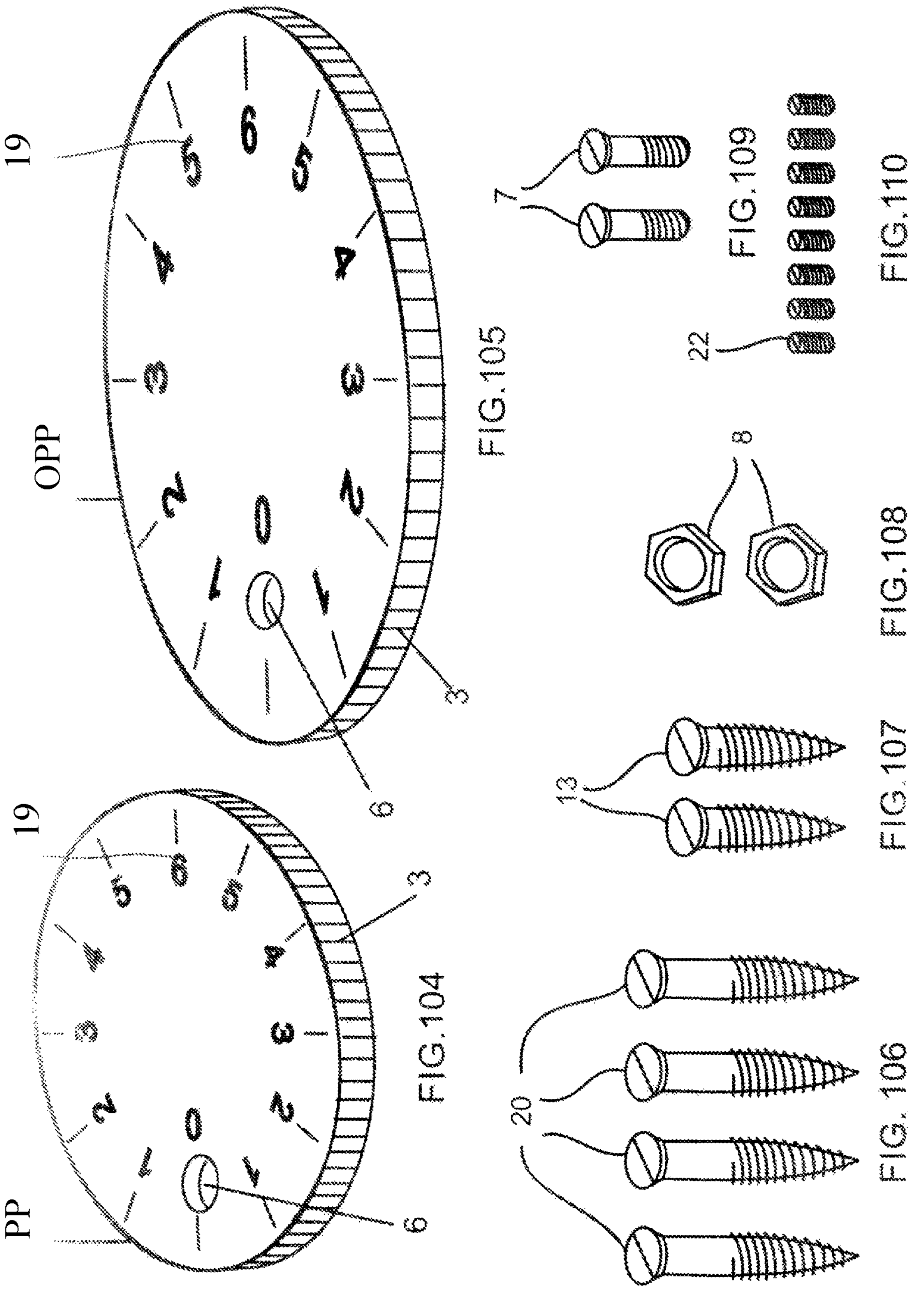

FIG. 104 is a Round Pressure plate (PP), knurling (3), through the hall at off-center (6) pressure number on the surface dial (19)

FIG. 105 is an oval-shaped Pressure plate (OPP), knurling (3), through the hall at off-center toward the small size of an oval (6), pressure number on the surface dial (19)

FIG. 106 is a screw that has a half thread and countersunk head. (20)

FIG. 107 is a screw that has a half thread and countersunk head. (20)

FIG. 108 is Two hexagonal nuts (8)

FIG. 109 is Two bolts (7) has half thread and countersunk head

FIG. 110 is an Eight full thread nut. (21) without head/grub screw.

Figure 111:
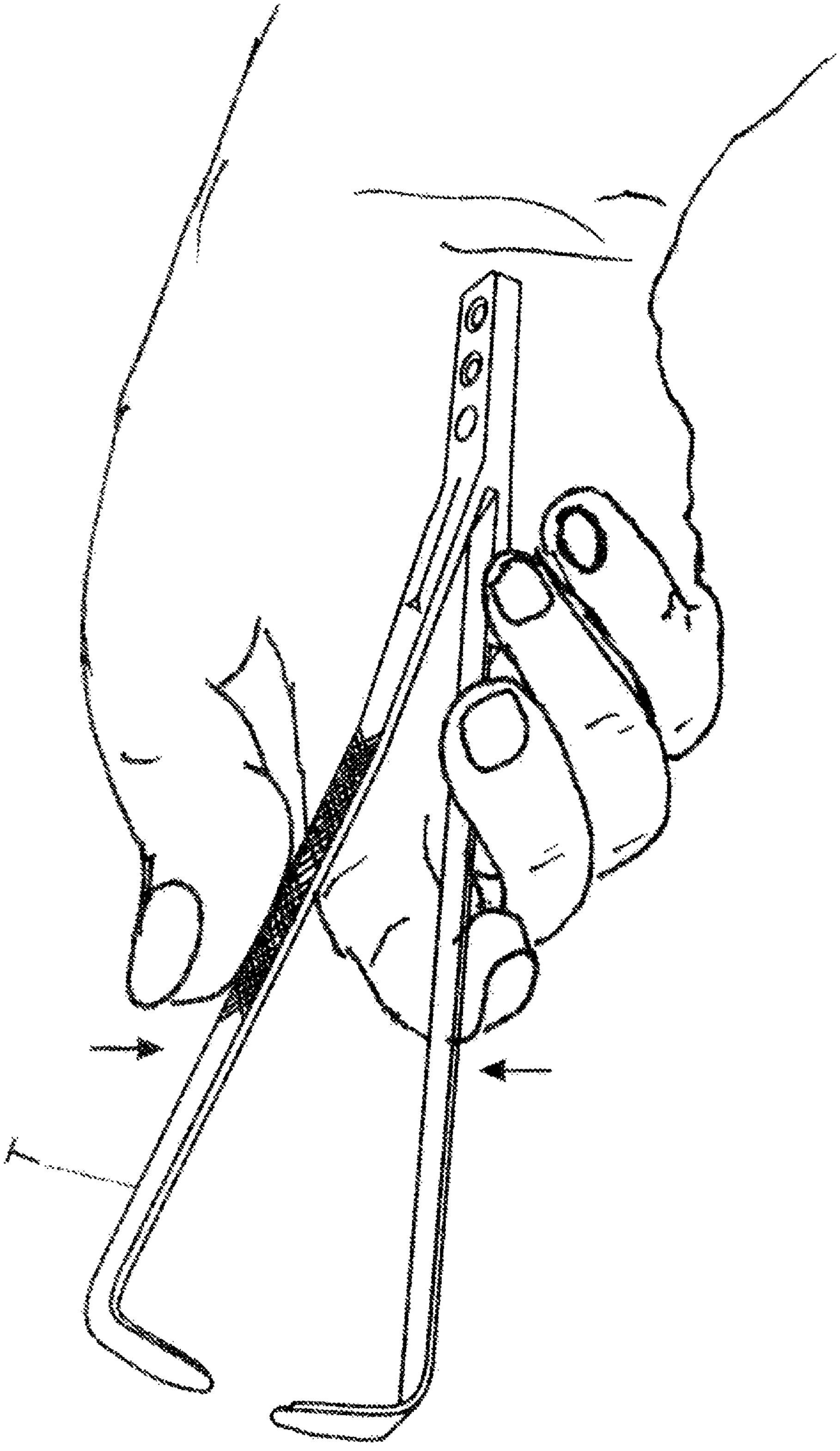

FIG. 111 is a view shows the tongs-type embossing tool (T) held in hand in between thumb and fingers and both arms of the tool pressed by thumb and fingers for making embossed art on paper and other media. The arrow shows the movement of both arms. (1)

Figure 112:
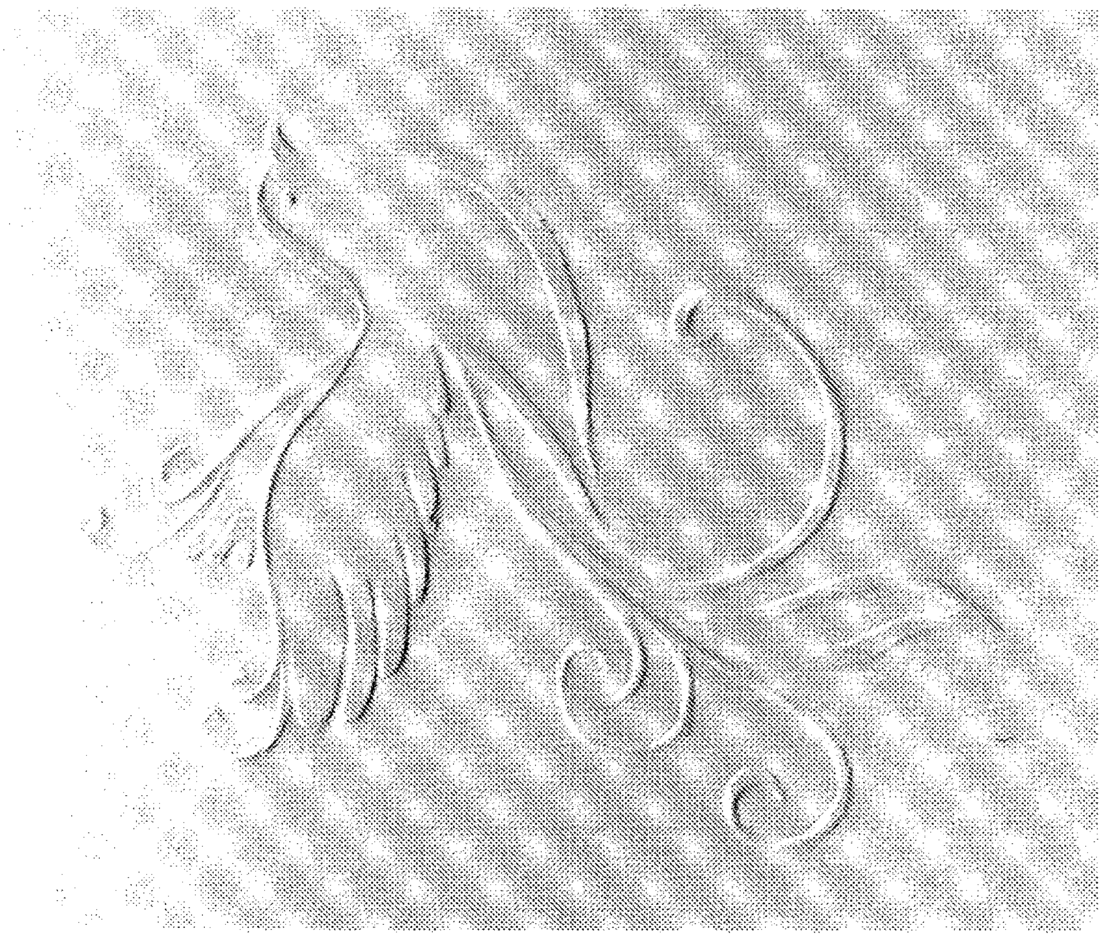

FIG. 112 is a photocopy of Embossing art done on card paper. Art was done by using a tongs-type embossing tool with other embossing tool. One can easily notice the variation of the width of the line in between two letters "L" shaped line and the sharp end of the embossing art line.

* (I) number 1 in roman language

** (II) number 2 in roman language

REFERENCE CHARACTER

T Tongs-type embossing tool.

PP Pressures Plate. Round shape

A angle

P paper or embossing media

F an embossing line form.

T1 Tongs-type embossing tool wherein the upper arm has been convex to outer side curve shape.

T2 Tongs-type embossing tool where upper teeth are larger vertically in length.

RP Rubber type plastic gripper on the arms of tongs-type embossing tool.

PT Tongs-type embossing tool made of full plastic.

B Embossing tool holder-cum-Engrave Block.

RG half-round Groove.

VG letter 'V' shape Groove.

LG letter 'L' shape Groove.

I Roman letter number 1

II Roman letter number 2

AT Attachable embossing tooth type tips.

TS Triangle Stylus.

BH hole of round ball shape.

R finger Ring.

S Plastic stylus.

SS Magnetic stainless steel/ferrous metal stylus.

M Magnet round/rectangle

OPP Oval-shaped Pressure Plate.

REFERENCE NUMBERS

NO. 1 Embossing Tips,

NO. 2 slot,

NO. 3 Knurling,

No. 4 Number pointer,

No. 5 Three through-holes,

No. 6 one off-center through the hole on pressure plate,

No. 7 Balthazar half thread and countersunk round head,

NO. 8 hexagonal nuts,

NO. 9 curve on the upper arm,

No. 10 longer tip of Upper arm of the tong embossing tool

No. 11 rib portion of plastic tongs-type embossing tool,

No. 12 Hard material holding stripe,

No. 13 Countersunk head half thread screws,

No. 14 four through the hall with countersunk on the top surface end,

No. 15 Nonskid rubber-type base resting support,

No. 16 Full thread hole,

No. 17 Horizontal extension on both side of tips,

No. 18 Ball on the head of finger Ring,

No. 19 Number marking on Pressure plate,

No. 20 half thread and countersunk round head mounting screws,

No. 21 Cut on finger Ring,

No. 22 Machine thread grub screw,

No. 23 Corrugated-type middle gripper part of the plastic stylus,

No. 24 Colored marking indication for the upper arm of the tong embossing tool No. 25 two full thread hole for mounting of tongs embossing tool.

No. 26 metal washer.

DETAILED DESCRIPTION OF THE INVENTION

The Prior-art of paper embossing tool's patents as per patent search.

| | |
|---|---|
| 1. Pat. no.; U.S. Pat. No. 6,446,549 B1 | Date of the patent; Sep. 10, 2002 |
| Inventor; Carla B. Soucie | Title; HAND-HELD |
| Peter w. Soucie | EMBOSSING TOOL |
| 2. Pub. no.; US 2005/0279230 A1 | Pub. Date; Dec. 22, 2005 |
| Inventor; Lee Chung H, Jong Her city (TW) | Title; EMBOSSING STYLUS |
| 3. Pat. no.; US 20050279231 A1 Date of Patent; Dec. 22, 2005 | |
| Inventor; Lee Chung H. Title; EMBOSSING STYLUS | |

Referring to the Figures from above-patented embossing tools there are shown examples of the Prior-art and a preferred but not only, embodiment of the invented emboss-ing tool.

Figure 2:
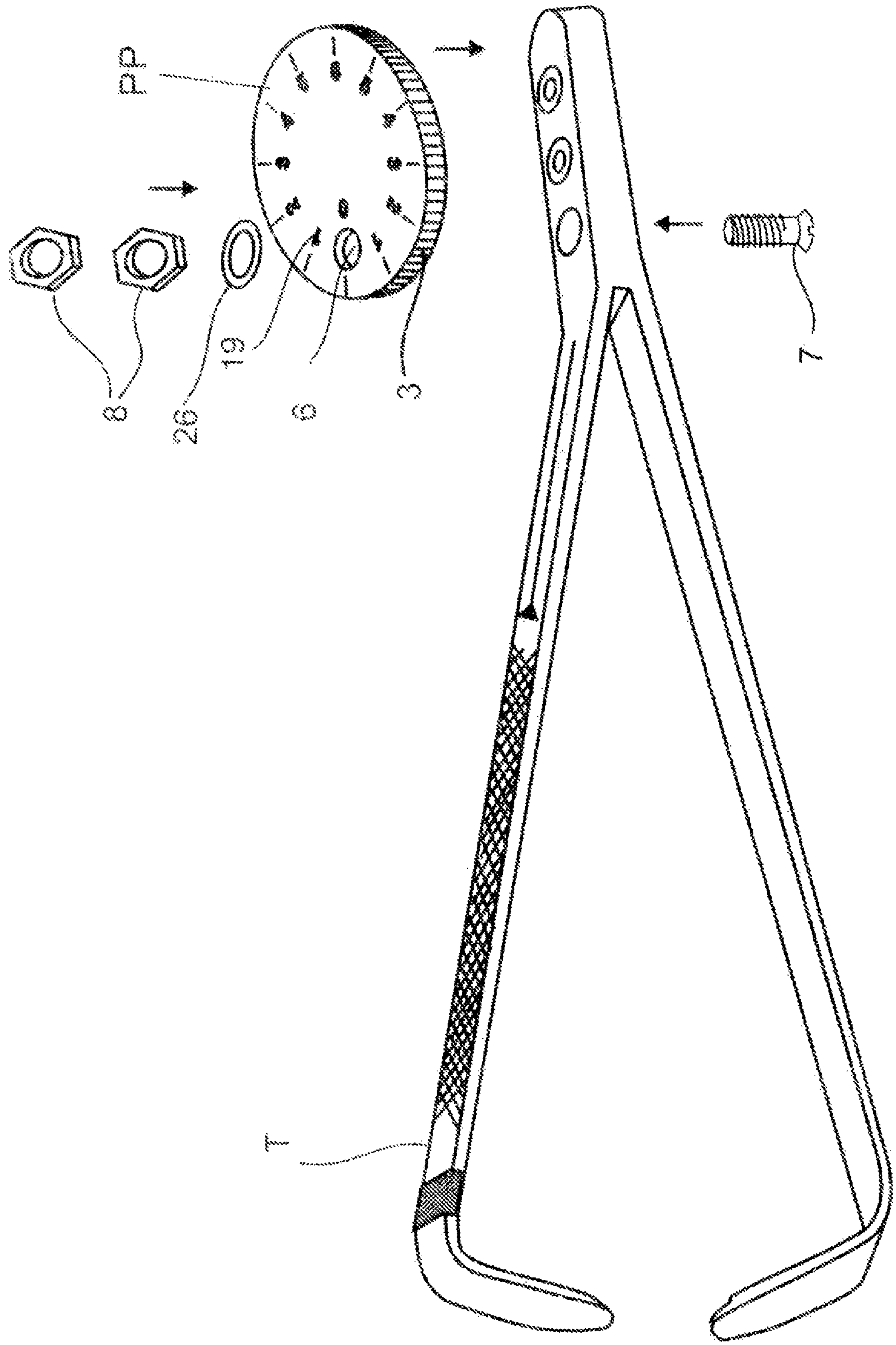
FIG. 2 is a perspective view of assembly line for riveting the pressure plate (PP) at the joined end of the two arms of the tongs embossing tool (T) in FIG. 1 with help of bolt (7), two nuts (8) and washer (26) at the off-center through-holes (6) in pressure plate (PP), the number dial (20) on the top surface of the pressure plate. The arrows show the place for attaching of pressure plate (PP).

All the above patents are for an embossing stylus-use with the template, All tips are Round, Sphere shape, Prior-art drawing page 1A FIG. 2 of U.S. Pat. No. 6,446,549 B1 the tool is preferably a two-ended embossing tool, wherein each end has a differently-sized roller ball that rotates/rolls in all directions inside a retainer. Each roller ball is biased outward, by a detent-style spring unit. that has been used in the past and present with the template for hand-embossing of paper Prior-art drawing page 2 A FIG. 3a of U.S. Pat. No. 6,446,549 B1 is a cross-section view of an elongated stylus showing spring mechanism and ball, FIG. 3b is an enlarged detail view of the ball, spring, and retainer, Prior-art drawing page 3 A FIG. 4 of U.S. Pat. No. 6,446,549 B1 shows the paper rest on the template and an elongated stylus sliding in the groove of half-round depth by Appling manual pressure on said invented stylus.

Figure 5:
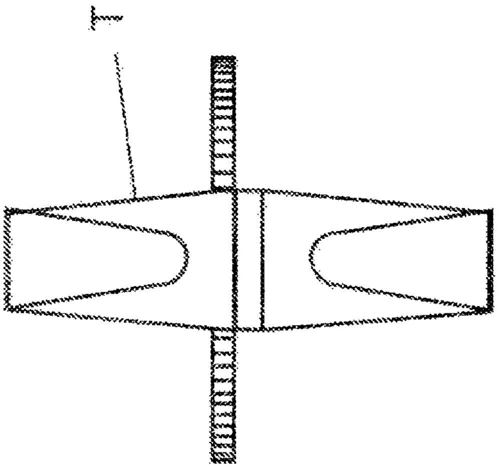
FIG. 5 is a front side view of an embodiment of FIG. 3 showing the round pressure plate (PP) in zero pressure position and both the tips (1) in apart (open) position.
Figure 7:
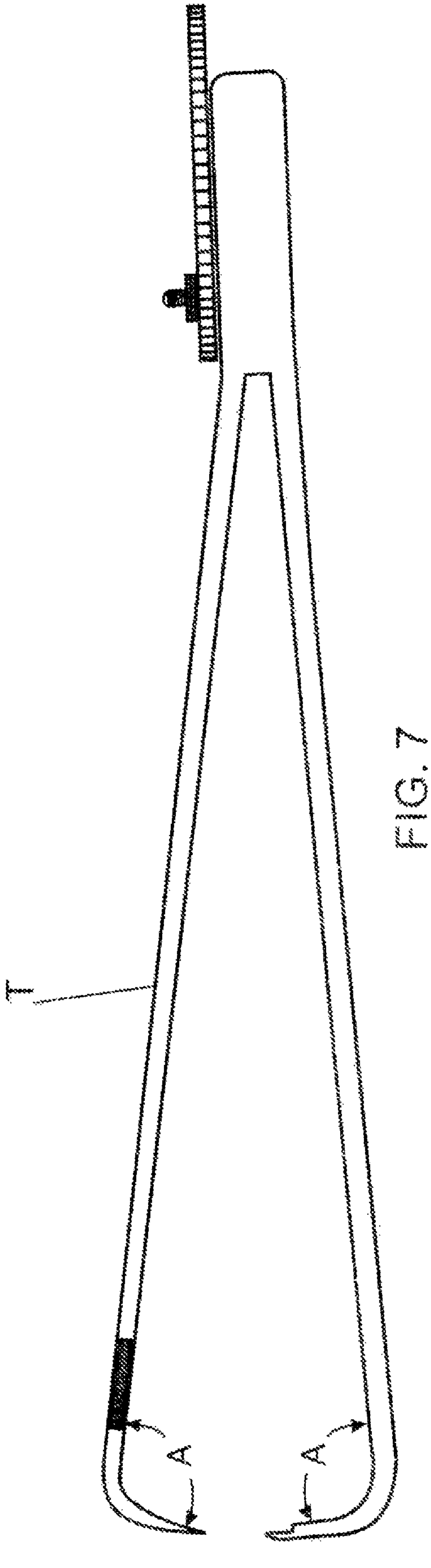
FIG. 7 is a right side view of a two embodiments of FIG. 3 showing the round pressure plate (PP) in zero pressure position and both the tips (1) in an apart (open) position where bending of two open arms (A) is at a certain angle. The left side view is the same as or mirrors the right side view.
Figure 8:
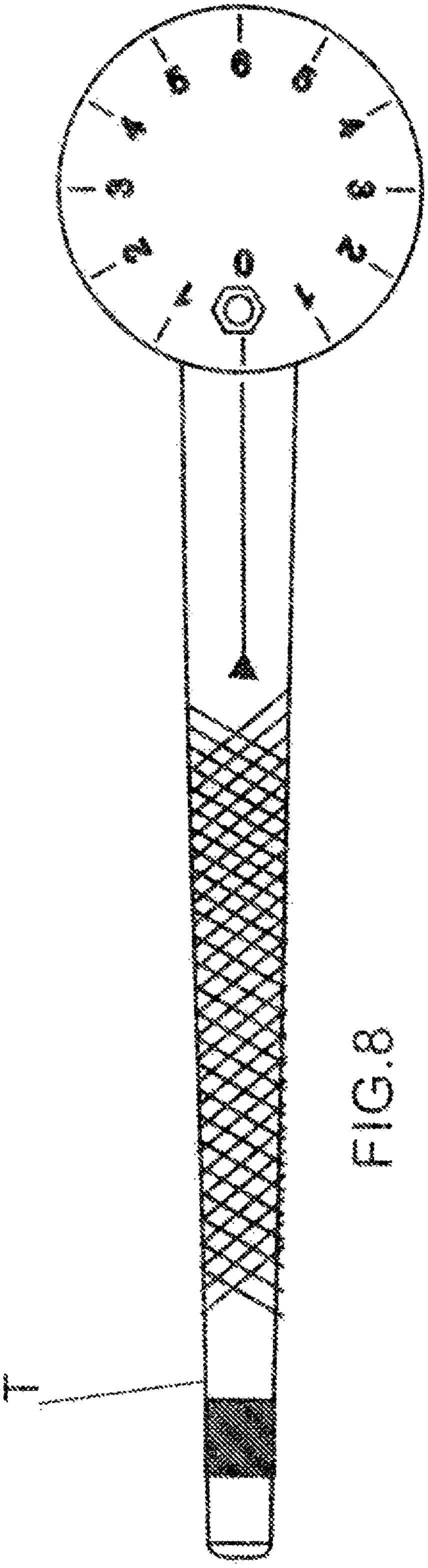
FIG. 8 is a top view of two embodiments of FIG. 3 showing round pressure plate (PP) in zero pressure position and both the tips (1) in apart (open) position with the bottom tip outside and the upper tip inside.
Figure 9:
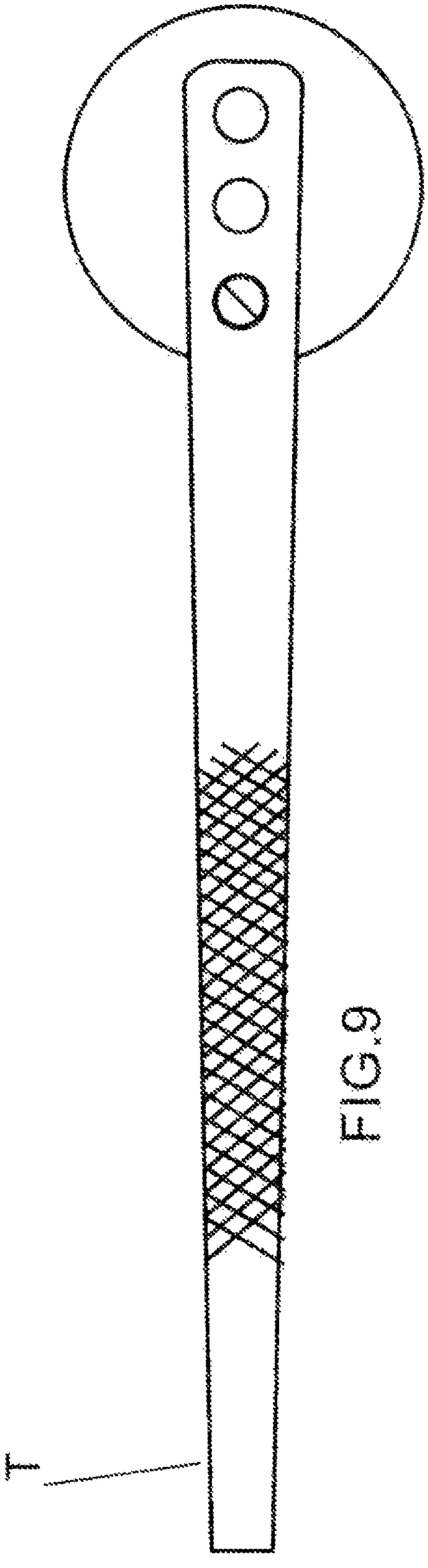
FIG. 9 is a bottom view of a two embodiments of FIG. 3 showing the round pressure plate (PP) in zero pressure position and both the tips (1) in apart (open) position.

Prior-art drawing page 4 A FIG. 5 of U.S. Pat. No. 6,446,549 B1 shows the enlarged view of how ball tip works on paper (P) emboss in the groove of a template (T).

Figure 6:
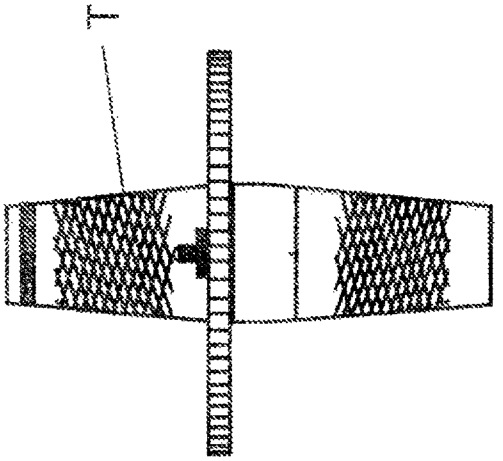
FIG. 6 is a backside view of a two embodiment of FIG. 3 the round pressure plate (PP) in zero pressure position of pressure plate (PP) and both the tips (1) are in apart (open) position.

Prior-art drawing page 5 A FIG. 6 of U.S. Pat. No. 6,446,549 B1 shows more enlarged view of tip assembly and detail of parts. where spring and ball are only moveable part in stylus.

Figure 1:
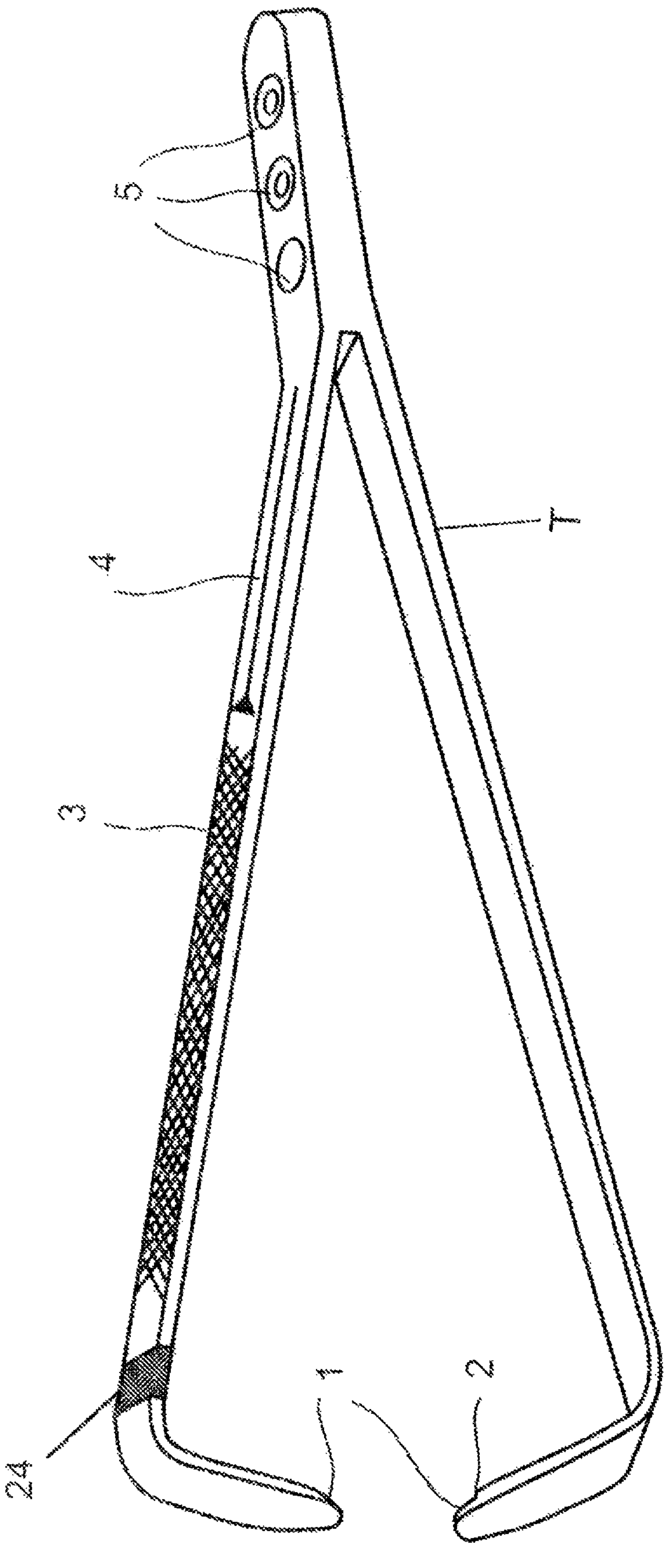
FIG. 1 is a perspective view of one embodiment of the invented simple Tongs-type embossing tool (T) showing teeth-type points (1), slot (2), knurling (3) on outer sides of both arms, arrow marking on upper arm (4), three through countersink holes (5) at the john of two arms, colored sleeve/marking (24) on the upper arm.

Prior-art drawing Page 1B FIG. 1a and FIG. 1b of Patent no.; US 2005/0279230 A1 show a conventional stylus wherein tip fix in wooden or plastic handle with ball shape tips that have been used in the past and present with the template for hand-embossing of paper, Prior-art drawing page 1C of patent no.; US 20050279231 is drawing of stylus for embossing design, The stylus has a central body portion, a removable embossing tip, having at list one embossing point and spring biasing mechanism. The spring biasing mechanism is disposed on one end of the central body portion, and configured to contact the remov-able embossing tip, biasing the embossing point in an outward direction away from the center body portion, such that the embossing point can be used to emboss the desired design. The drawing show the assembly of point tip in an enlarge view wherein detailed of point tips and spring barrel holder.

Prior-art drawing page 2C FIG. 3 of patent no.; US 20050279231 shows the cross-section of changeable tips stylus.

Figure 4:
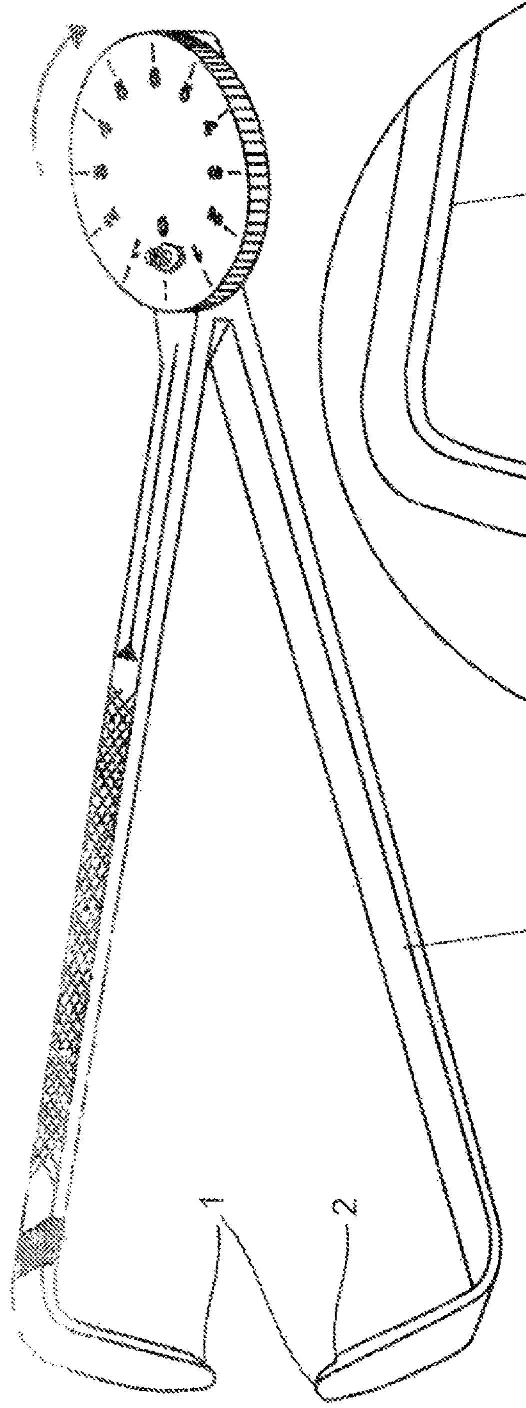
FIG. 4 is a perspective view of a embodiment of FIG. 3 showing the pressure plate (PP) at zero dial number (6) of pressure plate (PP) at pressure position and both the tips (1) are apart from each other in no pressure on the upper arm, (open) position.
Figure 4A:
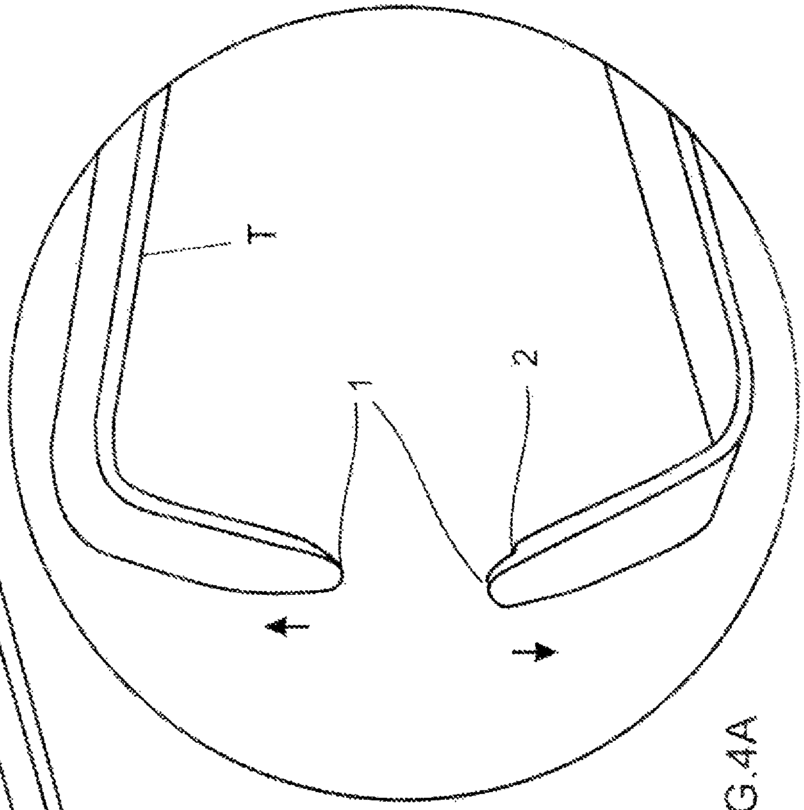
FIG. 4A is a detailed enlarged view of the tips (1) in an apart (open) position, embossing tool (T) slot (2). Arrows show the movement of two tips (1).

Prior-art drawing page 3C FIG. 4 of patent no.; US 20050279231 shows the detail of changeable stylus tip, FIG. 5 shows the fixing of the tip into the stylus body. The tip has two different size tips on each top and bottom.

In the process of embossing one has to rest the paper on the template and hold it with one hand and with the other hand press stylus tip and moving or rubbing on the paper to find channel then guide stylus tip into the channel to emboss design in the template. In this process an embossing line always be half-round deep shape, width of embossing line always be same because of shape of stylus tip is round and shape of channel groove is half-round, design always be what is on template, you cannot create your own design, Some of the limitations of those prior inventions of embossing tools are;

Stylus tip are ball shape only, the depth of the embossed line always half-round or less than half-round curve shape, Stylus work with template only, Channel groove finding by pressing and sliding stylus on paper by guesses, Stylus slide in the channel of the template, Stylus always follows designed in the template, The width and depth of the embossing line did not vary.

The starting point and endpoint of the embossed line is like a half-round,

One has to apply pressure all the time manually on the stylus.

The present invention is a hand-held and fixable tool for creating your own beautiful drawings and design art embossing on card paper or similar material like aluminum foil, copper foil, plastic paper and printed paper. New methods of performing the embossing art.

The present invention of the embossing tool is like Tweezers shape or Tongs shape. The end portion of two open arms of Tongs is bent inward to face each other. The bending angle (A) in figure No. 7 is more than 95 degrees. That works as two teeth upper and lower. the teeth are tapering in shape from base to tip (1). edge, taper from all four sides. the lower tip the same as the upper tip and/or has a projection slot (2) below the edge of the tip, the distance between tip to project slot is between 0.75 mm to 1.5 mm. Depending upon the size and bending of teeth of tongs-type embossing tool, if the bending angle is more than 110 degree and tool length size is small e.g. less than 8" than there is no slot, this slot stops the upper tip to going further down and band the paper from that point, the edges of tips are not razor sharp but round, so paper does not cut while being pressed in between two tips. Both tips touch each other like front and back. The lower tip is outside and the upper tip is inside so the embossing line of letter "L" shape forms on the paper and when either the paper or the tongs-type embossing tool is turned upside down the letter "L" shaped form in mirror shape. In between these two "L" shaped lines the embossing art line forms in the desired width and also where two "L" shaped emboss lines meet side by side a sharp-pointed art line is created. when the single "L" shaped line's both end joint the inside of drawing will be embossed.

The tips on the teeth made into the shape of half vertical oval shape or half-round shape tips (1), Hold tongs-type embossing tool in hand the thumb is on the upper arm and four fingers in under lower arm, Applying pressure on both spans in between thumb and fingers. so both tips come together and in between both tips, the card paper will be pressed to create an embossing line by holding card paper on the other hand and sliding tongs-type embossing tool on the paper. The embossing line in letter "L" shape deep and by rotating either tongs-type embossing tool or paper upside down the emboss line form in mirror/reveres of letter 'L' shape deep. In between two 'L' shape lines, the embossed line is formed so one can make the desired width of embossing line art. where two "L" shape line meets the pointed end of line form.

This Tongs embossing tool one can use it anywhere and in seating, standing, and sleeping position in hands without template or engrave channel block-cum-holder, use in-between thumb and fingers, The Tongs embossing tool is made of steel metal. The Tongs embossing tool also made of plastic (PT) and also made of plastic and metal combine (RP) in various size and shape but the shape of tips on the teeth type point remains the same, hence the art line embossing remains same. The present invention of embossing tool where knurling (3) on outer side of both span or soft plastic for better holding of embossing tool and one pointer mark (4) on top of upper span and three through-hole (5) at the joint of two-span first hole for attachment of pressure plate (PP) and last two-hole for mounting or fixing tongs-type embossing tool on wooden block or on the tabletop.

The present invention includes attachment of pressure plate (PP) on the hole (5) at the joint of two arms using nut and bolt (7) and then fix the embossing tool using rotating hard metal stripe (12) of FIG. 15 on engraving-cum-holder block (B) or on wooden block or on table-top using last two-hole (5) of embossing tool and screw (13). to stand the tongs-type embossing tool hold firmly. Pressure plat work only In this holding stationary position, for easy movement of paper and to rid of manual pressing on both the span of embossing tool one has to firmly fix the tongs-type embossing tool with attached pressure plate, The pressure plate is only moveable part in tongs-type embossing tool.

By rotating pressure plate on fixed tongs-type embossing tool from number 0 to 6 (20) the pressure will generate on the upper arm of the embossing tool while the lower arm is stationary. the benefit of controlled pressure one will get even depth or bump of embossing line all the time. both hands are free to moving card paper for desire drawing line direction for beautiful embossing design arts.

The only limitations are the size of the paper depends on the length of the tongs embossing tool where the size of the paper is bigger than the length of the tongs-type embossing tool. Larger-sized paper cannot rotate a full 360 degrees because the paper stops at the joint of two arms of tongs-types embossing tool. The present invention of tongs-types embossing tool wherein two more versions of the tongs-type embossing tool one the half-round type curve shape of upper span to accommodate the slightly bigger size of card paper by folding or rolled in extra space between two arms of the embossing tool. In the second version of the embossing tool wherein the height or length of the upper teeth is more than usual to accommodate the somewhat bigger size of card paper by folding or rolled in extra space between two arms of the embossing tool.

The present innovation of Engraved template Block-cum-holder of Tongs-type embossing tool. wherein hard metal rotting stripe plate and slot on end of the top surface in the center of the small side of rectangle block, it is a quick, easy and firmly held tongs-type embossing tool under the strip. the other way of mounting tongs-type embossing tool is to use two-hole of tongs-type embossing tool at the joint end of two arms with screws on a wooden block or on table-top. wherein the engraving channel of the straight-line groove, curve line groove, French curve line groove in half-round shape wherein depth of channel are in letter "V" shape deep, and the letter "L" shape deep and half-round shape. Engraving channels are on top surface of block. And on the edge of engrave channel the printing of borderline on the top surface in transparent color blue for half-round groove, color green for letter 'V' shape groove and color red for letter 'L' shape groove, the present invention of engrave block when rest on aluminum/silver foil or on the light box the printing line can be seen through paper this will help to find groove and easy to match with pencil drawing line on the paper and do embossing with stylus which is on index finger, the engraving block-cum-holder has base with two strips of non-skid rubber and four through-holes for fixing engrave block with screw-on wooden block/table-top, the engrave template block is made of transparent plastic to use on light box or light can be placed at the side of block or put alumina/silver foil under the block for light reflect/pass through.

The present innovation of Plastic stylus for embossing on paper with engraving block . . . the vertical height of stylus is 4 inches and width ⅜ inch. and the shape of stylus like letter "Z" at both ends of the stylus has two tip same shape of different sizes. Both tips band in the opposite direction from the middle. The bending helps to see the backside of stylus thus help to follow drawings on media by slide stylus and moving paper. the middle holder part is like a corrugated designee to press and hold stylus properly. The stylus is made of plastic molded material or forged metal. The plastic is cost-saving and easy for mass production. Metal is good for the environment and more durable.

The present innovation of Triangle stylus has three different sizes of tips each at the three angles of the triangle, the triangle stylus hold/wear in finger with ball head self adjust the ring. The stylus rotates at the ball joint so one can easily select tips from three tips. The stylus and ring are made of plastic, Triangle stylus also is made of magnetic steel, ferrous metal material with slight variation and using with the magnetic head ring. The advantage of holding the stylus in a finger is that one does not have to pickup styles so often while working on engraving block/template for embossing design art.

The present innovation of Magnetic Stainless steel or ferrous metal stylus or combine with plastic and magnetic steel together, the stylus is like a vertical strip shape with both ends having different size or shape points. This stylus also holds in finger with magnetic head self-adjusting finger-ring. The stylus is made of magnetic stainless steel metals and or magnetic steel and plastic. The finger ring is made of plastic and magnet. The advantage of holding the stylus in the finger that one has not to pickup styles so often while working on the art of embossing.

Magnetic Stainless steel or ferrous metal stylus is durable and useful on thicker and stiff card paper media where more pressure is required for embossing art.

Some of the existing problems are solved in the present invention of hand healed tongs-type embossing tool which also gives more benefit to the artist while operating embossing tools and trying to make easy operation.

The following are the benefits:

(1) Easy to create with desired width in between two emboss line by drawing two separate letter "L" shaped lines FIG. 11 C, (2) By joining two emboss lines one can create a Pointed end drawing a line or design FIG. 112

(3) This Tong's type handheld embossing tool can be used in seating, standing and sleeping positions, (4) Easy to carrying in a pocket or in the handbag. When using Tongs embossing tool with pressure plate it must be mounted on engraving block or on any woodblock by screw in a hole located at the joint of two arms than doing embossing art the pressure plate will give desire pressure by alien number (19) on pressure plate with pointer mark (4) on Tongs embossing tool's upper arm to get throughout even emboss line, artist can move card paper easily without applying manual pressure while free both hand in any direction to create embossing line. For reverse L-shaped embossed line one has to turn card paper upside down. FIG. 11C The prior existing invention of stylus's tips are round ball shape. Stylus tool ball tip press over card paper on the top of a template with open channels on the designs of template to emboss. While applying pressure on round ball tip stylus into the half-round channel the paper is lifted up from both the side of the ball tip and emboss line are not sharp at edge of half-round emboss line. The end of the lines is a half-round shape not pointed. The advantage of present invention is that the stylus tips of half-round and letter "V" shape has a straight collar shape at both sides of half-round and letter "V" shaped tips that prevents card paper from lifting up from both sides, one can create pointed end of embossing line by rotating stylus tip in a groove which will help to give sharp edge to emboss art line At the end of embossing line.

The present invention of the stylus tips is not in ball shape it is flats and taper from four side at tip's, shape of half-round curve, half-oval curve and letter 'V' shape to make various size and shape of embossing artwork on paper, with this stylus artist can do embossing like Calligraphic letter drawing by twisting stylus in a groove channel and by twist, the stylus at the end line of drawing art one can create pointed embossing line at end.

The dimensions are;

The size of the tongs tool arm's length within a range of about 4 inch to 15 inch The width of the tongs tool arms within a range of about 3/8 inch to 5/8 inch The thickness of the tongs tool arms made of metal within a range of about 1/64 inch to 3/64 inch The thickness of the tongs tool arms made of plastic within a range of about 3/32 inch to 3/16 inch The width of the tip of the tongs tool within a range of about 3/32 inch to 5/32 inch The size of ball of ball-head ring is about 1/8 inch diameter to 3/16 inch diameter The size of magnet of magnetic-head ring is about 1/4×3/8 rectangle and 5/16 diameter of round magnate.

The size of the triangle stylus within a range of about 1.25 inch to 2 inch each side of the triangle.

The thickness of the triangle stylus within a range of about 3/16 inch to 1/4 inch The size of the plastic letter 'Z' shape stylus within a range of about 3.5 inch to 5 inch in height.

The thickness of the letter 'Z' shape stylus made of plastic within a range of about 3/32 inch to 1/4 inch The vertical height of Magnetic stylus within the range of about 2.5 inch to 4 inch in length The width of Magnetic stylus within the range of about 5/16 inch to 1/2 inch The thickness of Magnetic stylus within the range of about 1/16 inch to 1/8 inch in length All other dimension changes according to the height and length of the tools.

The hardness of the material used for manufacturing above invented tool depends on theirs all oversize's and purpose of use.

The invited embossing tools are recommended for children above 5 years and for any attachment please take help from an adult person.

The embossing tools do not contain any liquid or corrosive material, or any razor-sharp points, edges, corners or tips.

SEQUENCE LISTING

Not Applicable

PATENT CITATIONS (3)

| Publication number | Priority Date | Publication Date | Assignee | Title |
|---|---|---|---|---|
| (1) U.S. Pat. No. 6,446,549 B1 | Nov. 16, 2000 | Sep. 10, 2002 | Carla B. Soucie | Hand-held Embossing Tool |
| (2) US 2005/0279230 A1 | Jan. 17, 2004 | Dec. 22, 2005 | Chung H. Lee | Embossing Stylus |
| (3) US 2005/0279231 A1 | Jun. 17, 2004 | Dec. 22, 2005 | Chung H. Lee | Embossing Stylus |

The teeth type tip's height of arms bent within a range of about 1/8 inch to 1 inch The open space in between two tips of tongs tool within a range of about 1/8 inch to 1/4 inch The diameter of the pressure plate within a range of about 1 inch to 2 inch The major radius of oval pressure plate within a range of about 5/8 inch to 1 3/4 inch The size of engraving block-cum-holder of tongs embossing tool within a range of about 4×6 inch to 8×12 inch, The thickness of engraving block-cum-holder of tongs embossing tool within a range of about 3/8 inch to 1/2 inch, The size of the tips of all stylus within a range of about height 1/16 inch to 3/16 inch and width within a range of about 1/16 inch to 3/16 inch. without side extension, The height and width and shape of the groove channel are 1/32 inch bigger than the size of stylus's tips.

The size of ball head and magnetic head ring is within a range of about us no. 3 to us no 8 adjustable.

We claim:

1. A hand-operated tongs-type embossing tool system comprising:

a moveable pair of arms, wherein the moveable pair of arms has an opened end and a jointed end such that the moveable pair of arms: (i) taper from the jointed end to the opened end and (ii) bend inwards at the opened end, thereby tips of the open-end of the moveable pair of arms face each other as an upper tip and a lower tip;

media pressed in-between the upper tip and the lower tip, wherein the media is configured to receive pressure from the moveable pair of arms to form an embossing line in the letter "L" shape by rotating a pressure plate on the jointed end of the moveable pair of arms, while the embossing tool system is attached to an engraved plastic template and an arm of the moveable pair of arms is held under the pressure plate; and a small colored mark and a long pointer arrow mark on the arm proximal to the jointed end of the moveable pair of arms, wherein the arm proximal to the jointed end of the moveable pair of arms is an upper arm;

wherein the jointed end comprises three through-drilled holes, wherein the three through-drilled holes comprises a first hole, a second hole, and a third hole, wherein the pressure plate is configured to: (i) be riveted, (ii) have a round shape or an oval shape, and (iii) be rotatable on the first hole, wherein the first hole has a countersink from a bottom side;

wherein the second and the third drilled holes comprise a countersink on a top side such that the second and third drilled holes are configured for screwing-in and fixing the embossing tool system on a surface;

wherein the embossing tool system with the pressure plate comprises a rectangular base within a top surface of the engraved plastic template and within a center of the engraved plastic template and proximal to an end of the engraved plastic template;

wherein the upper tip and the lower tip are attached on respective arms of the moveable pair of arms proximal to a bent surface of the opened end, thereby the upper tip and the lower tip together are configured for forming a round shape and letter 'V' shape embossing line on the media.

2. The hand-operated tongs-type embossing tool system of claim 1, wherein the two arms are further configured to allow the media to be rolled and slid in between the two arms of the moveable pair of arms and placed in between the upper tip and the lower tip.

3. The hand-operated tongs-type embossing tool system of claim 1, wherein each of the pair of arms, at the opened end, is bent inward and toward each other, thereby forming tooth-shaped embossing tips, wherein the tooth-shaped embossing tips have: a half circle or half beggar radius of an oval curve and a slight projected step, wherein the slight projected step is in contact with the upper tip, wherein the upper tip is in contact with the lower tip, wherein the upper tip and the lower tip taper form four sides from a base to the half circle.

4. The hand-operated tongs-type embossing tool system of claim 1, wherein the pressure plate comprises a through hole located off-center toward a circumference of the pressure plate and a vertical knurling on an outer side of the pressure plate, wherein the pressure plate is configured to rotate in a clockwise or anti-clockwise direction.

5. The hand-operated tongs-type embossing tool system of claim 1, wherein the upper tip and the lower tip are proximal to a bent surface of the opened end, wherein the upper tip and the lower tip comprises a half-circle curved-shaped tip and the letter 'V'-shaped tip, a side extension collar guide, a rectangular structure having a slot extending from a first side to a second side, two full-thread holes in each side of the slot, such that the upper tip and lower tip are made of metal and plastic materials configured to: (i) taper in shape from the four sides of the rectangular structure to the edge of the upper tip or the lower tip and (ii) be attachable to each other via a male-female die connecting mechanism, wherein the rectangular structure and the side extension collar guide are in the upper tip and lower tip.

* * * * *